US 8,199,128 B2
Jun. 12, 2012

(12) United States Patent
Suetomi et al.

(10) Patent No.: US 8,199,128 B2
(45) Date of Patent: Jun. 12, 2012

(54) PROTECTION PANEL WITH TOUCH INPUT FUNCTION

(75) Inventors: Yoshiko Suetomi, Kyoto (JP); Yoshihiro Kai, Kyoto (JP); Kazuhiro Nishikawa, Kyoto (JP); Jun Shimizu, Kyoto (JP); Toshiyuki Iwai, Kyoto (JP); Mitsutoyo Toshihara, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 12/992,432

(22) PCT Filed: May 25, 2009

(86) PCT No.: PCT/JP2009/059546
§ 371 (c)(1),
(2), (4) Date: Feb. 3, 2011

(87) PCT Pub. No.: WO2009/145154
PCT Pub. Date: Dec. 3, 2009

(65) Prior Publication Data
US 2011/0122090 A1    May 26, 2011

(30) Foreign Application Priority Data

May 29, 2008  (JP) ................................. 2008-140435

(51) Int. Cl.
*G06F 3/045* (2006.01)
(52) U.S. Cl. ..................................... 345/174; 178/18.05
(58) Field of Classification Search .................. 345/173, 345/174; 178/18.03, 18.05
See application file for complete search history.

(56) References Cited

U.S. PATENT DOCUMENTS

| 5,518,078 | A | * | 5/1996 | Tsujioka et al. | ........... 178/18.05 |
| 6,088,024 | A | * | 7/2000 | Yamagata | ...................... 345/173 |
| 6,380,497 | B1 | * | 4/2002 | Hashimoto et al. | ........... 200/5 A |
| 6,720,952 | B1 | | 4/2004 | Takizawa | |
| 7,071,926 | B2 | * | 7/2006 | Kusuda et al. | ................ 345/173 |
| 2004/0160423 | A1 | | 8/2004 | Takizawa | |

FOREIGN PATENT DOCUMENTS

| JP | 3081815 A | 4/1991 |
| JP | 4342008 A | 11/1992 |
| JP | 06-149463 | 5/1994 |
| JP | 07-287638 | 10/1995 |
| JP | 10-113969 | 6/1998 |
| JP | 2002202849 A | 7/2002 |
| JP | 2005049978 A | 2/2005 |

* cited by examiner

*Primary Examiner* — Jimmy H Nguyen
(74) *Attorney, Agent, or Firm* — The Webb Law Firm

(57) ABSTRACT

A protection panel for detecting an X-Y coordinate as an operation position from a potential gradient based on a touch operation to a front substrate is provided. A rear substrate (5) has a first transparent resistive film (5A) and a contact point (5G) connected to a pair of first terminals (5D) through routing circuits (5C) so that the contact point (5G) is arranged in parallel with the first transparent resistive film (5A). When the rear substrate (5) and a front substrate (6) are connected, the contact point (5G) and an expanded region (6Ab) of a second transparent resistive film (6A) on the front substrate (6), which are arranged opposingly with a predetermined gap, form a switch (12) for detecting a contact therebetween, based on a voltage detected in the terminals (6D,5D) of one of the rear substrate (5) and the front substrate (6) when a voltage is applied between the terminals (5D,6D) of the other.

2 Claims, 19 Drawing Sheets

Fig. 4
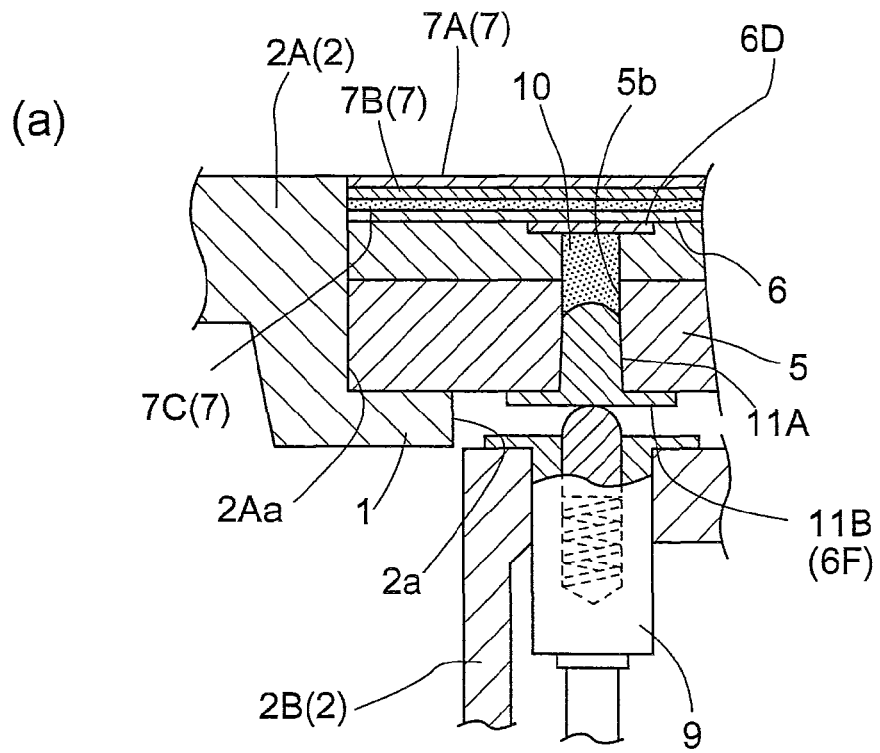
(a)
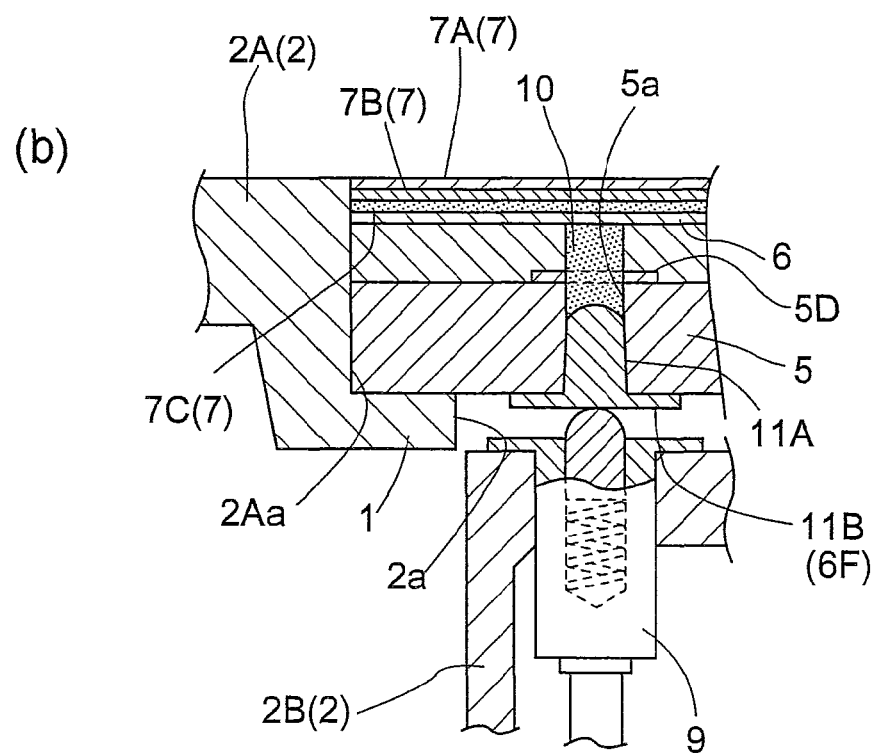
(b)

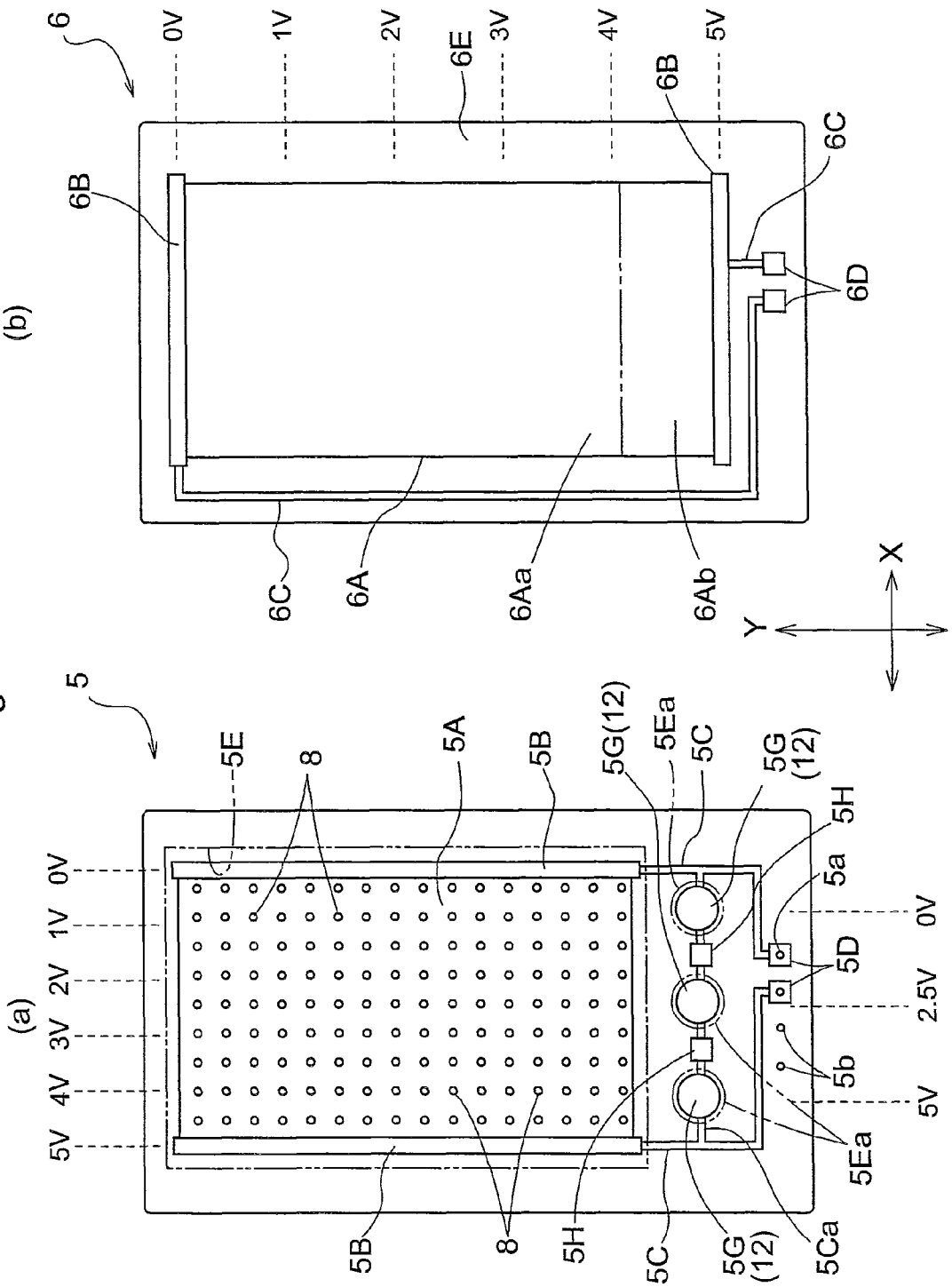

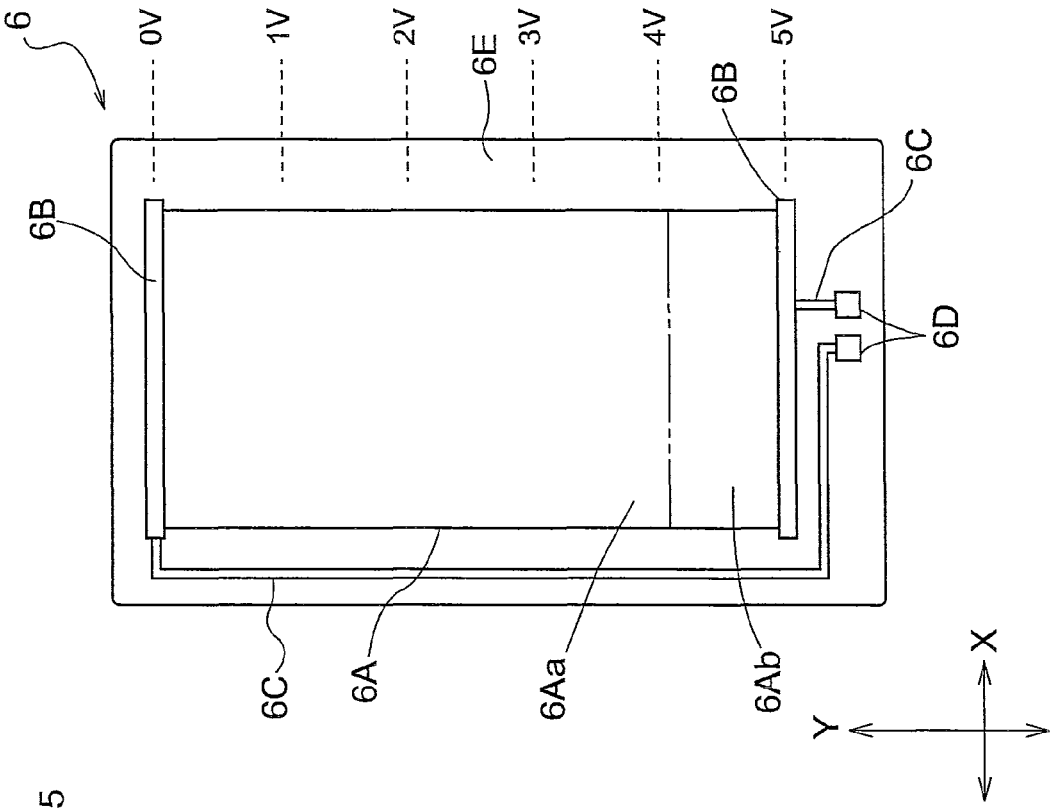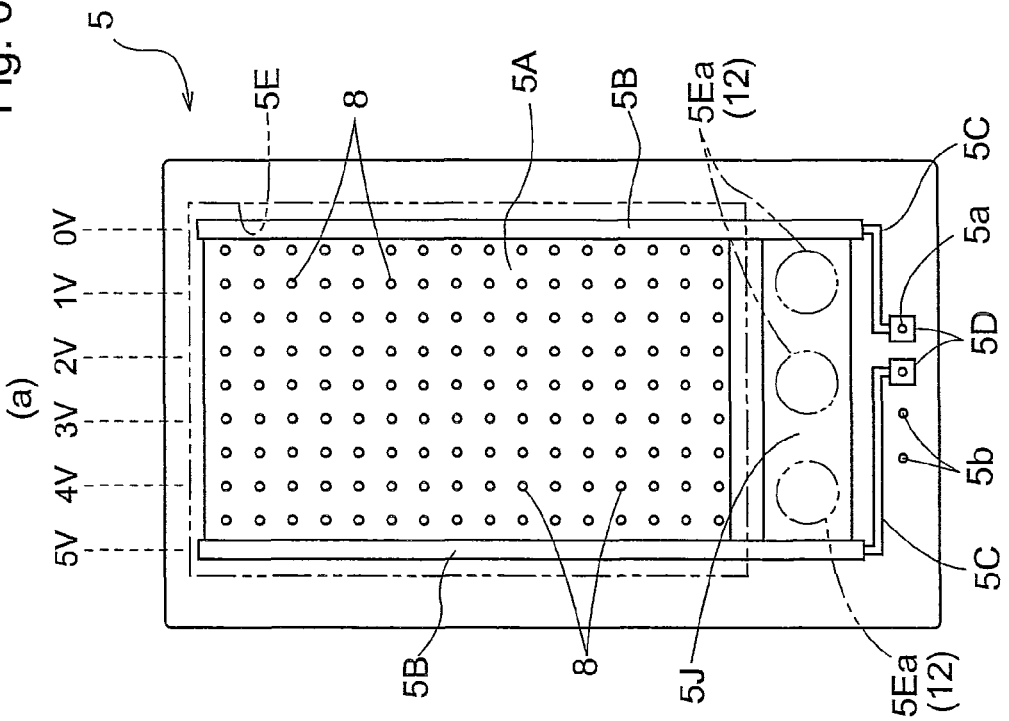

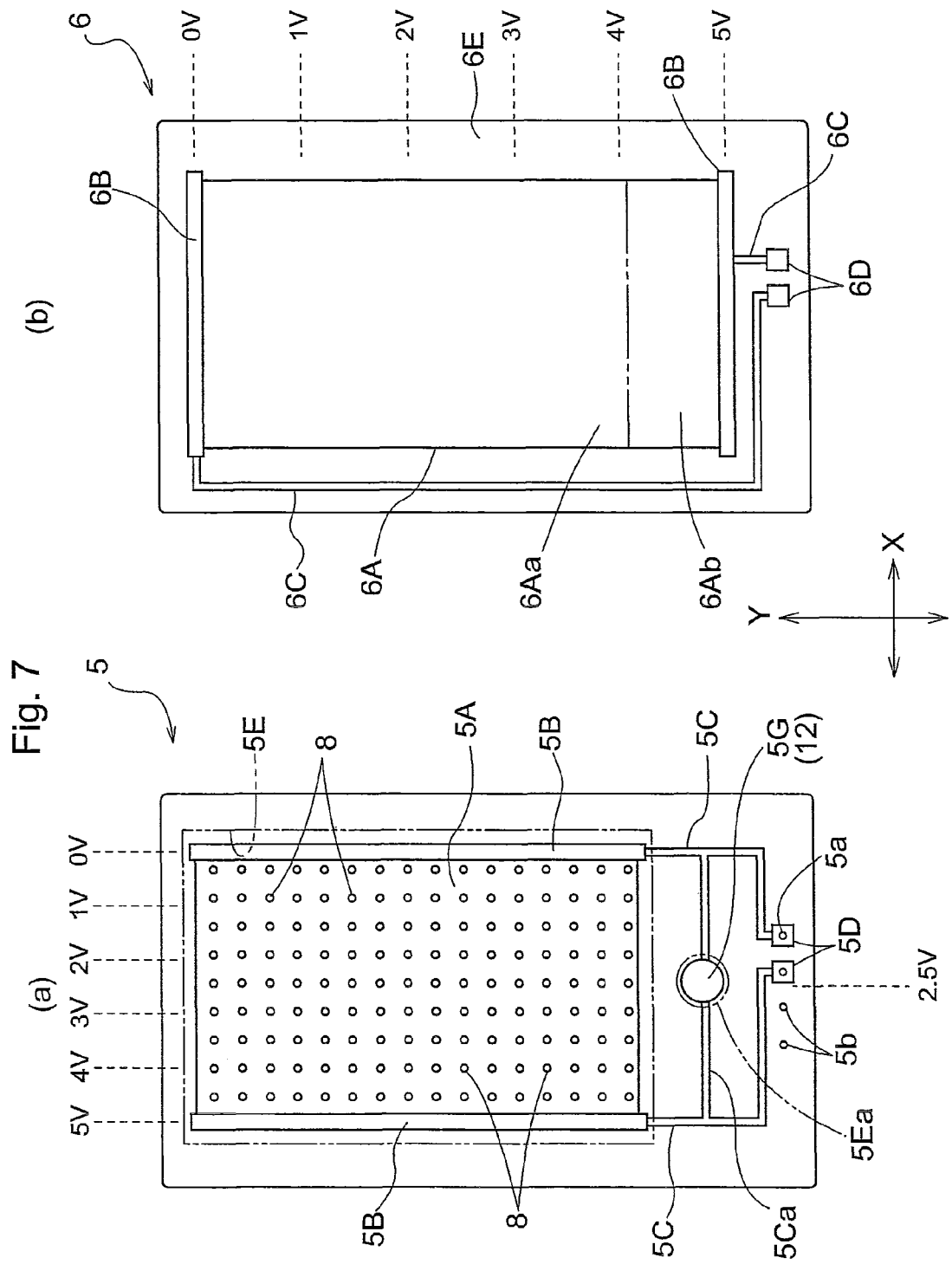

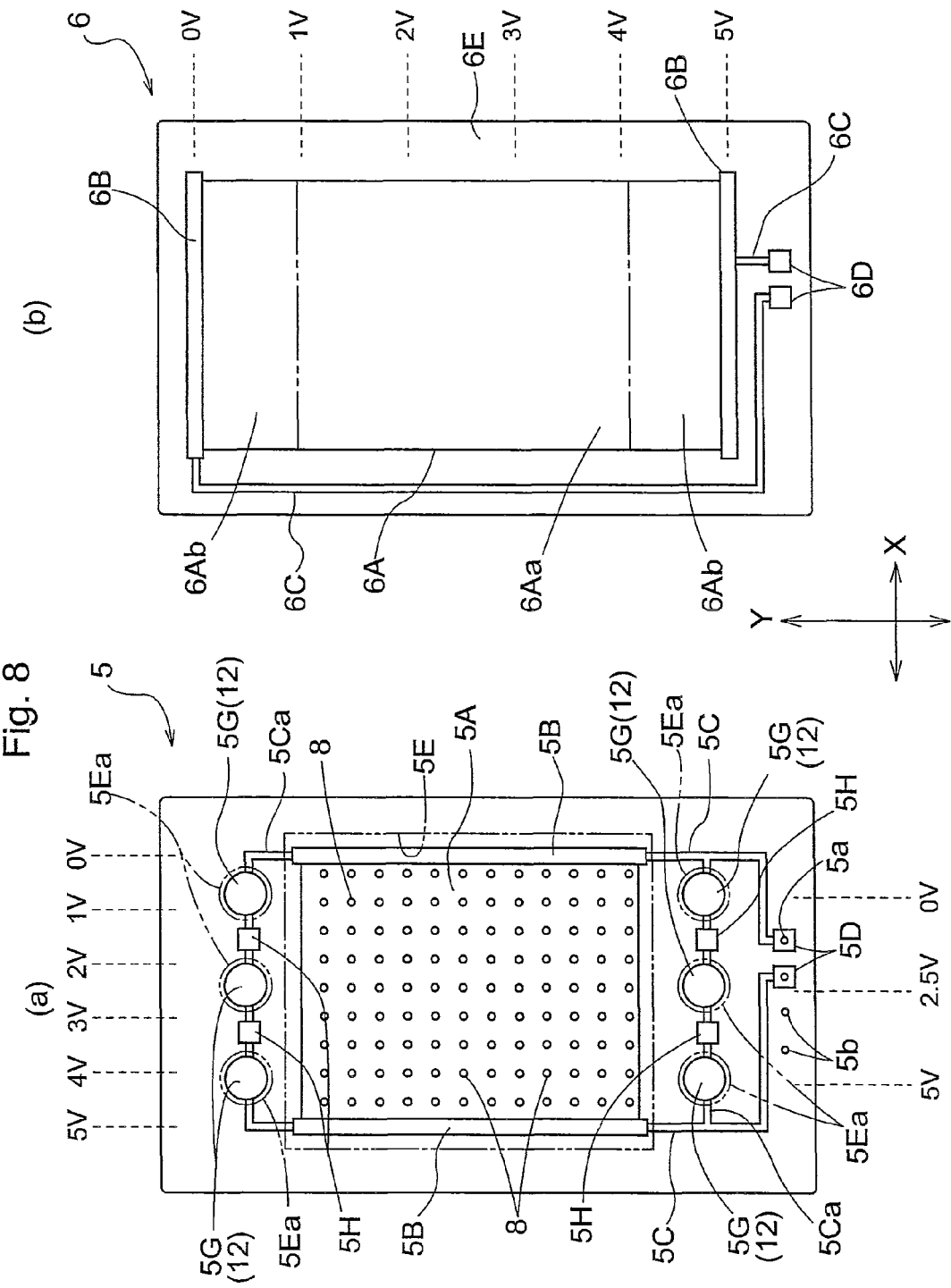

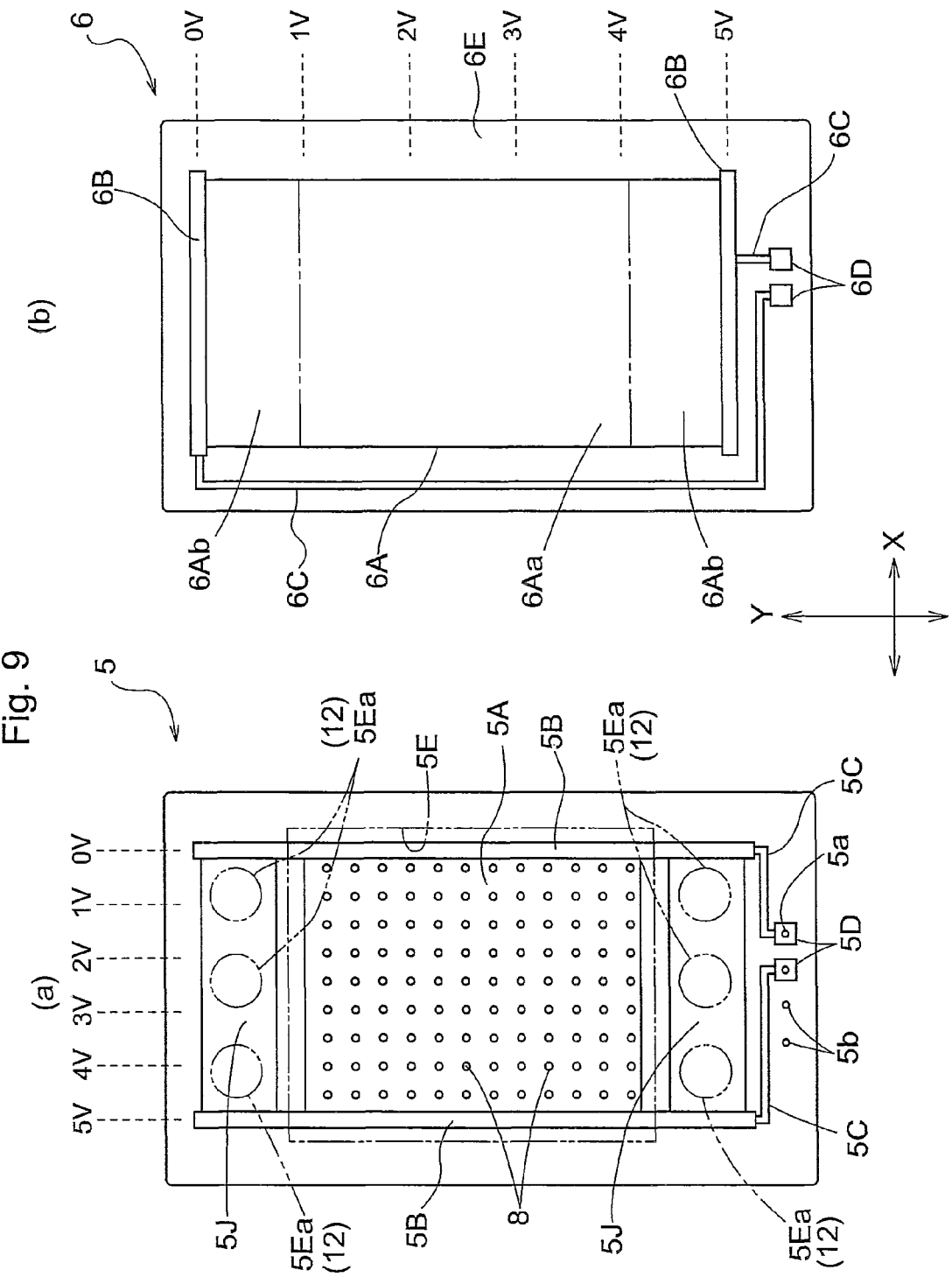

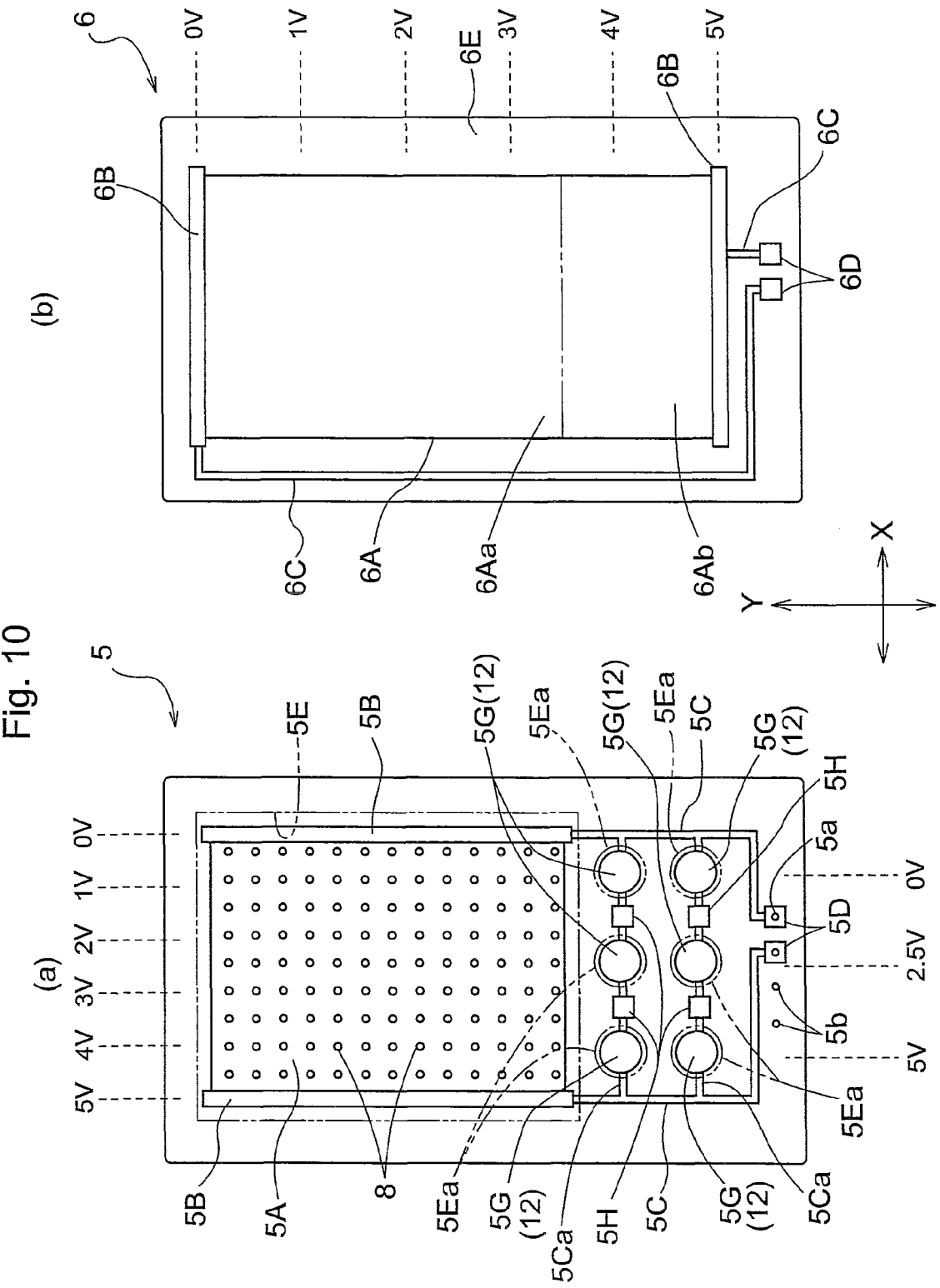

Fig. 12
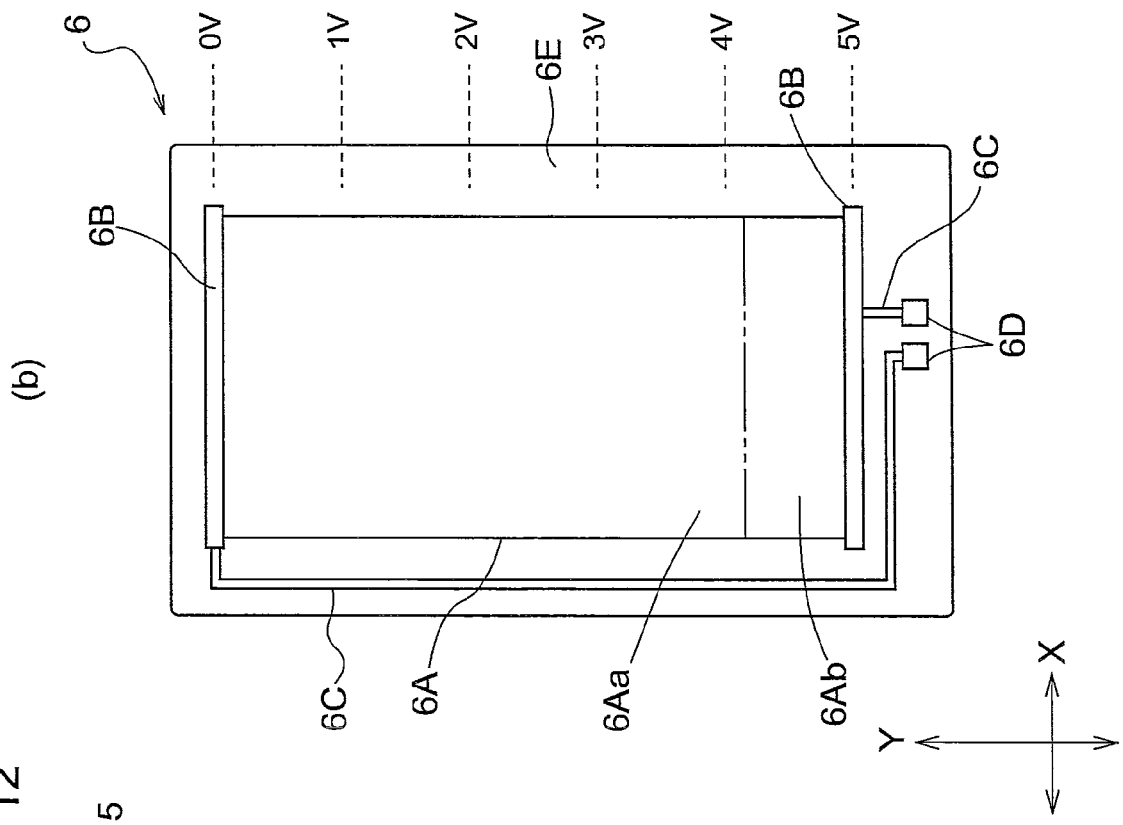
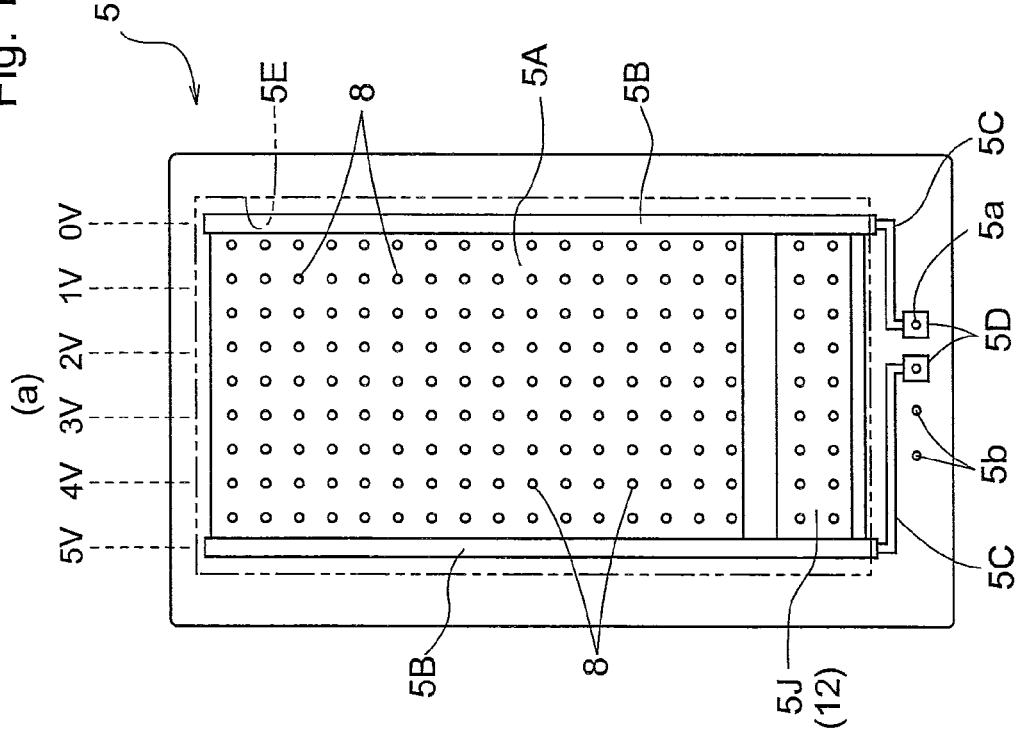

Fig. 15
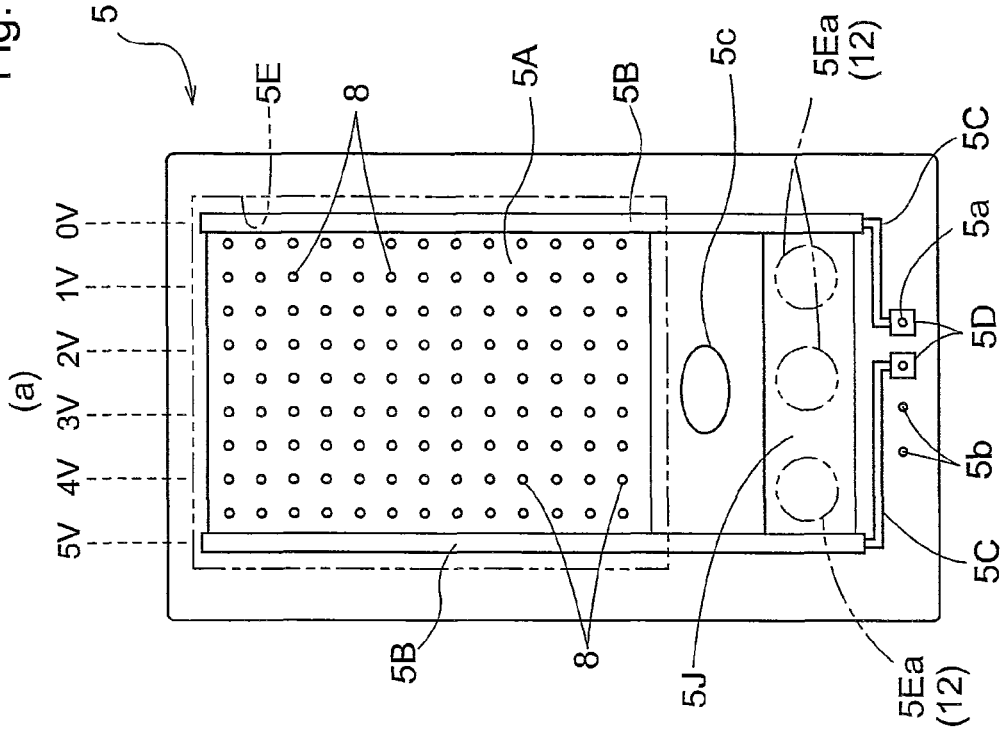
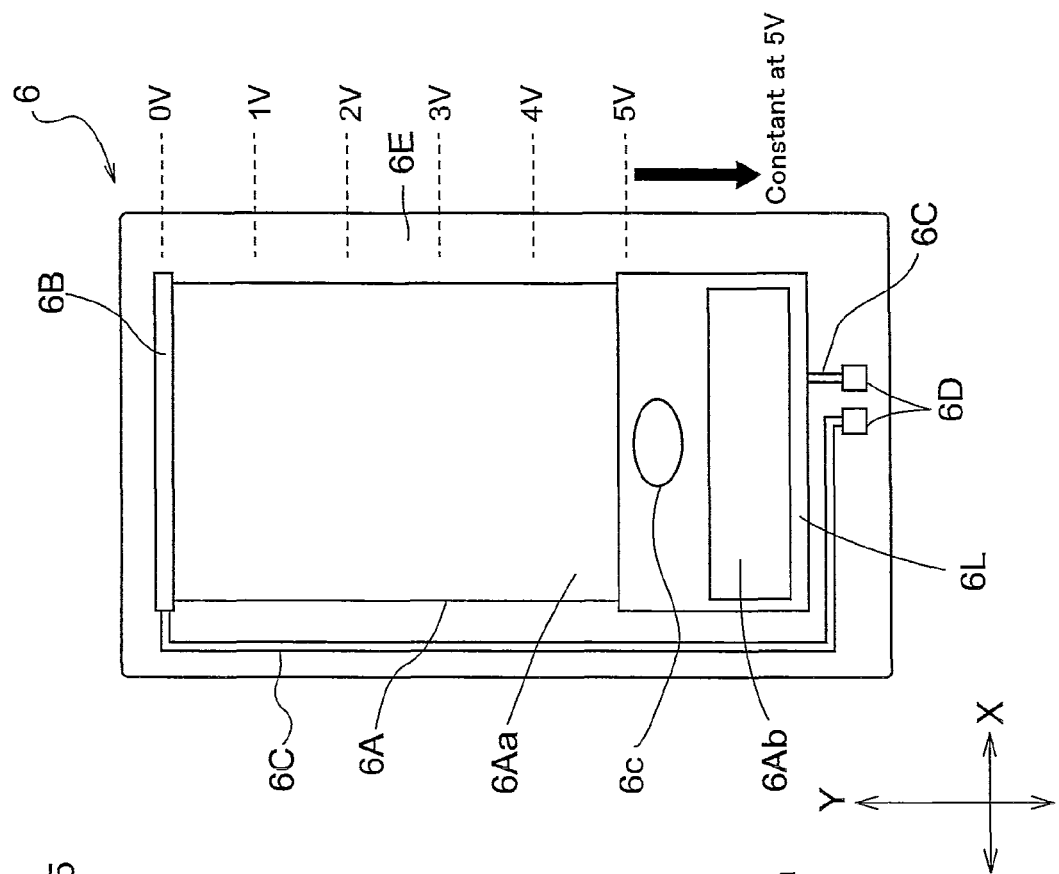

PROTECTION PANEL WITH TOUCH INPUT FUNCTION

TECHNICAL FIELD

The present invention relates to a protection panel with touch input function including: a rear substrate whose front face is provided with a first transparent resistive film, a pair of bus bars arranged on opposing sides of the first transparent resistive film, and a pair of first terminals connected to the respective bus bars through respective routing circuits; and a front substrate whose rear face is provided with a second transparent resistive film, a pair of bus bars arranged on opposing sides of the second transparent resistive film, and a pair of second terminals connected to the respective bus bars through respective routing circuits, and whose front face is provided with a decorated rim portion, the rear substrate and the front substrate being connected so that the first and second transparent resistive films are arranged opposingly with a predetermined gap, and that one of the two pairs of the bus bars are arranged on the opposing sides of the transparent resistive film in an X-direction and the other of the two pairs of the bus bars are arranged on the opposing sides of the transparent resistive film in a Y-direction, to form an analog coordinate input part for detecting an X-Y coordinate as an operation position from a potential gradient based on a touch operation to the front substrate.

BACKGROUND ART

The protection panel as described above is provided in an electronic device, such as mobile-phone, smartphone, PDA, car navigation equipment, digital camera, digital video camera, portable gaming device and tablet, in such a manner that a touch input operation in accordance with a displayed content can be performed, while protecting a display part of a display device provided in the electronic device.

In recent years, in the mobile-phone, smartphone and the like as an example of the electronic device having a protection panel described above, there have been developed those having an e-mail function and an internet function, in addition to the essential telephone function, and those having a camera function and a music player function, further to the functions described above. For such an electronic device in which multiple functions are given, techniques have been proposed in which operability is enhanced by providing the protection panel with switches corresponding to those functions.

SUMMARY OF INVENTION

However, in the conventional configurations, in order to provide the switches 12, not only terminals 5D,6D and respective routing circuits 5C,6C for an analog coordinate input part are formed, but also terminals 5K,6K and respective routing circuits 5F,6F specialized for the switches 12 should be additionally formed, around a transparent resistive film 5A of a rear substrate 5 and a transparent resistive film 6A of a front substrate 6, as shown in FIG. 20. Accordingly, it is necessary to secure a large area that allows an additional formation of a plurality of the routing circuits 5F,6F for the switch 12 at the positions around the transparent resistive films 5A,6A, and to form a complicated circuit. As a result, the application of the configuration described above to the protection panel will lead to growth in size of the protection panel and growth in complexity of the circuit configuration.

An object of the present invention is to provide a switch to the protection panel having touch input function, without leading to growth in size of the panel or the like which may otherwise be caused by the additional formation of a terminal specialized for switch, a corresponding routing circuit and the like.

In a first feature of the present invention for attaining the above-described object, there is provided a protection panel with touch input function including: a rear substrate whose front face is provided with a first transparent resistive film, a pair of bus bars arranged on opposing sides of the first transparent resistive film, and a pair of first terminals connected to the respective bus bars through respective routing circuits; and a front substrate whose rear face is provided with a second transparent resistive film, a pair of bus bars arranged on opposing sides of the second transparent resistive film, and a pair of second terminals connected to the respective bus bars through respective routing circuits, and whose front face is provided with a decorated rim portion, the rear substrate and the front substrate being connected so that the first and second transparent resistive films are arranged opposingly with a predetermined gap and that one of the two pairs of the bus bars are arranged on the opposing sides of the transparent resistive film in an X-direction and the other of the two pairs of the bus bars are arranged on the opposing sides of the transparent resistive film in a Y-direction, to form an analog coordinate input part for detecting an X-Y coordinate as an operation position from a potential gradient based on a touch operation to the front substrate, wherein in the front substrate, an expanded region is provided adjacent to a facing region where the second transparent resistive film faces the first transparent resistive film, with a distance between a pair of the bus bars widened, in the rear substrate, a contact point connected to a pair of the first terminals through the routing circuits is provided in parallel with the first transparent resistive film, when the rear substrate and the front substrate are connected, the contact point is arranged opposingly with a predetermined gap to the expanded region of the second transparent resistive film, and the contact point and the expanded region of the second transparent resistive film form a switch for detecting a contact therebetween, based on a voltage detected in the terminals of one of the rear substrate and the front substrate when a voltage is applied between the terminals of the other.

According to this feature, there is provided a contact point connected to a pair of the first terminals through the routing circuits so as to be arranged in parallel with the first transparent resistive film, and for providing a switch, the same terminal can be shared with the analog coordinate input part. Accordingly, there becomes no need to additionally form a terminal specialized for switch, a corresponding routing circuit and the like around the transparent resistive film of the rear substrate or the front substrate, and thus growth in size of the protection panel and growth in complexity of the circuit configuration can be prevented which may otherwise be caused by the additional formation of a terminal specialized for switch, a corresponding routing circuit and the like around the transparent resistive film.

In a second feature of the present invention, there is provided a protection panel with touch input function including: a rear substrate whose front face is provided with a first transparent resistive film, a pair of bus bars arranged on opposing sides of the first transparent resistive film, and a pair of first terminals connected to the respective bus bars through respective routing circuits; and a front substrate whose rear face is provided with a second transparent resistive film, a pair of bus bars arranged on opposing sides of the second transparent resistive film, and a pair of second terminals connected to the respective bus bars through respective routing circuits, and whose front face is provided with a decorated rim portion, the rear substrate and the front substrate being connected so that the first and second transparent resistive films are arranged opposingly with a predetermined gap and that one of the two pairs of the bus bars are arranged on the opposing sides of the transparent resistive film in an X-direction and the other of the two pairs of the bus bars are arranged on the opposing sides of the transparent resistive film in a Y-direction, to form an analog coordinate input part for detecting an X-Y coordinate as an operation position from a potential gradient based on a touch operation to the front substrate, wherein in the front substrate, an expanded region is provided adjacent to a facing region where the second transparent resistive film faces the first transparent resistive film, with a distance between a pair of the bus bars widened, in the rear substrate, a third transparent resistive film connected to a pair of the first terminals is provided in parallel with the first transparent resistive film, and a pair of bus bars are provided which are arranged on opposing sides of the third transparent resistive film and arranged in parallel with the bus bars, when the rear substrate and the front substrate are connected, the third transparent resistive film is arranged opposingly with a predetermined gap to the expanded region of the second transparent resistive film, and the third transparent resistive film and the expanded region of the second transparent resistive film form a switch for detecting a contact therebetween, based on a voltage detected in the terminals of one of the rear substrate and the front substrate when a voltage is applied between the terminals of the other.

According to this feature, there are provided the third transparent resistive film connected to a pair of the first terminals so as to be arranged in parallel with the first transparent resistive film, and a pair of bus bars which are arranged on opposing sides of the third transparent resistive film and arranged in parallel with the above-described bas bars, for providing a switch, the same terminal can be shared with the analog coordinate input part. Accordingly, there becomes no need to additionally form a terminal specialized for switch, a corresponding routing circuit and the like around the transparent resistive film of the rear substrate or the front substrate, and thus growth in size of the protection panel and growth in complexity of the circuit configuration can be prevented which may otherwise be caused by the additional formation of a terminal specialized for switch, a corresponding routing circuit and the like around the transparent resistive film. In addition, since the third transparent resistive film is arranged opposingly with a predetermined gap to the expanded region of the second transparent resistive film, a region where the third transparent resistive film and the second transparent resistive film face each other can be utilized as a touch input region different from a region where the first transparent resistive film and the second transparent resistive film face each other.

In a third feature of the present invention according to the invention described with the second feature, the expanded region of the second transparent resistive film is covered with the same material as that of the bus bar, except for at least a portion where the switch is formed.

According to this feature, since the portions around the expanded region are covered with the same material as that of the bus bar, a voltage value of the expanded region becomes constant. Accordingly, a voltage value can be used exclusively in the analog coordinate input part where the first transparent resistive film and the second transparent resistive film face each other, while in general a voltage value is used commonly in both the analog coordinate input part and the expanded region. In other words, the voltage value used in the analog coordinate input part becomes larger than usual, and thus a resolution to detect the coordinate input becomes greater.

In a fourth feature of the present invention according to the invention described with the third feature, an opening is provided in a portion covered with the same material as that of the bus bar, between the analog coordinate input part and the switch.

According to this feature, since the opening is present at a position covered with the same material as that of the bus bar, a microphone hole, a speaker, a mechanical switch and the like provided in the electronic device can be allowed to face externally between the analog coordinate input part and the switches, and thus design freedom can be enhanced.

In a fifth feature of the present invention according to the invention described with any one of the first to fourth features, a circuit configuration of the front face of the rear substrate and a circuit configuration of the rear face of the front substrate are interchanged.

According to this feature, by interchanging the circuit configurations of the rear substrate and the front substrate, freedom of the circuit configurations of the rear substrate and the front substrate can be enhanced.

BRIEF DESCRIPTION OF DRAWINGS

FIG. 4 shows longitudinal sectional side views of a relevant portion of a configuration of a switch and an electric conduction structure of a rear substrate.

FIG. 5 shows a front view of a rear substrate and a rear view of a front substrate in the first embodiment.

FIG. 6 shows a front view of the rear substrate and a rear view of the front substrate in a second embodiment.

FIG. 7 shows a front view of the rear substrate and a rear view of the front substrate in another embodiment.

FIG. 8 shows a front view of the rear substrate and a rear view of the front substrate in still another embodiment.

FIG. 9 shows a front view of the rear substrate and a rear view of the front substrate in yet another embodiment.

FIG. 10 shows a front view of the rear substrate and a rear view of the front substrate in still another embodiment.

FIG. 12 shows a front view of the rear substrate and a rear view of the front substrate in another embodiment.

FIG. 15 shows a front view of the rear substrate and a rear view of the front substrate in still another embodiment.

DESCRIPTION OF EMBODIMENTS (First Embodiment)

Figure 1:
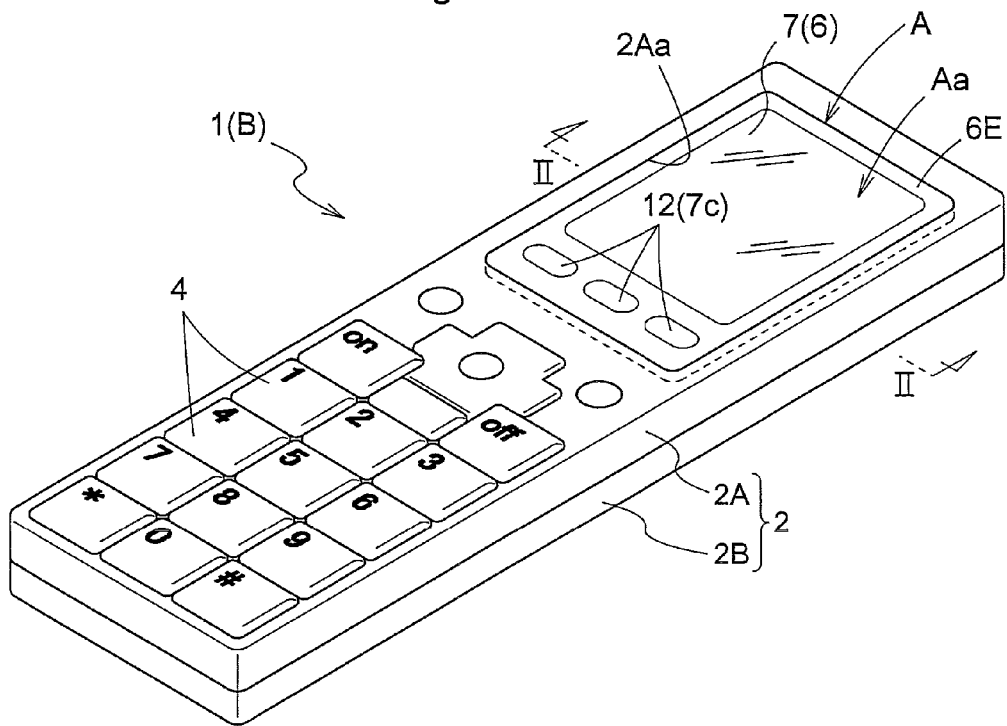
FIG. 1 is a perspective view of a mobile-phone in a first embodiment.

Hereinbelow, as one example of embodiment to carry out the present invention, a first embodiment in which a protection panel A with touch input function according to present invention is applied to a mobile-phone 1 as one example of an electronic device B will be described with reference to the drawings. It should be noted that in the description of each embodiment, the reference characters are designated to the components based on the drawings, and thus ordinal numbers, such as "first", "second" and "third", described in the claims are omitted.

In addition to the mobile-phone 1, examples of the electronic device B include smartphone, PDA, portable music player, car navigation equipment, digital camera, digital video camera, portable gaming device, and tablet.

Figure 2:
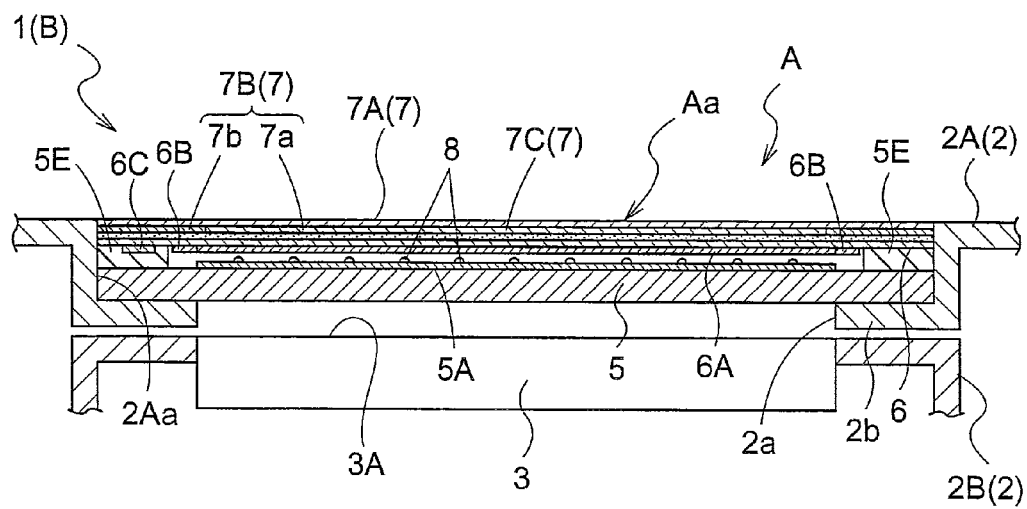
FIG. 2 is a transversal sectional view of a relevant portion showing a configuration of a protection panel.

FIG. 1 is an overall perspective view of the mobile-phone 1. FIG. 2 is a vertical sectional bottom view of a relevant portion of the mobile-phone 1. As shown in these drawings, the mobile-phone 1 includes: a housing 2 made of a synthetic resin; a display device 3 having a display part 3A, such as crystalline liquid and organic EL; input keys 4; and the like. The housing 2 includes: a front housing part 2A having a display window 2Aa formed in a front face; and a rear housing part 2B to which the display device 3 and the like is to be attached. The protection panel A is provided in the display window 2Aa of the front housing part 2A so as to protect the display part 3A of the display device 3.

The display window 2Aa of the front housing part 2A is formed as a recess that has a step which allows the protection panel A to be fitted into the recess. A bottom portion of the display window 2Aa is configured to have: an opening 2a for allowing the display part 3A of the display device 3 mounted in the rear housing part 2B to face externally; and a support frame 2b for supporting the protection panel A.

A shape and a size of the display window 2Aa may vary depending on a shape and a size of the protection panel A. A recess depth of the display window 2Aa may vary depending on a thickness or the like of the protection panel A. A shape and a size of the opening 2a of the display window 2Aa may vary depending on a shape and a size of the display part 3A. Herein, the shapes of the display window 2Aa, opening 2a, display part 3A, and protection panel A are set as rectangle or approximate rectangle. In addition, the recess depth of the display window 2Aa is set in such a manner that a surface of the housing 2 is in the same plane as a surface of the protection panel A.

A "touch input mechanism" of the protection panel A means a mechanism for detecting an X-Y coordinate defined as an operation position from a potential gradient, based on the touch operation relative to the surface of the protection panel A.

As shown in FIGS. 2-5, the protection panel A includes: a rear substrate 5 having a rectangular transparent resistive film 5A formed on a front face of the rear substrate 5; and a front substrate 6 having a rectangular transparent resistive film 6A formed on a rear face of the front substrate 6, the transparent resistive films 5A,6A being opposingly arranged with a predetermined gap in such a manner that an air layer is formed between the films. In the protection panel A, a region where the rectangular transparent resistive films 5A,6A face each other functions as an analog coordinate input part Aa.

Figure 3:
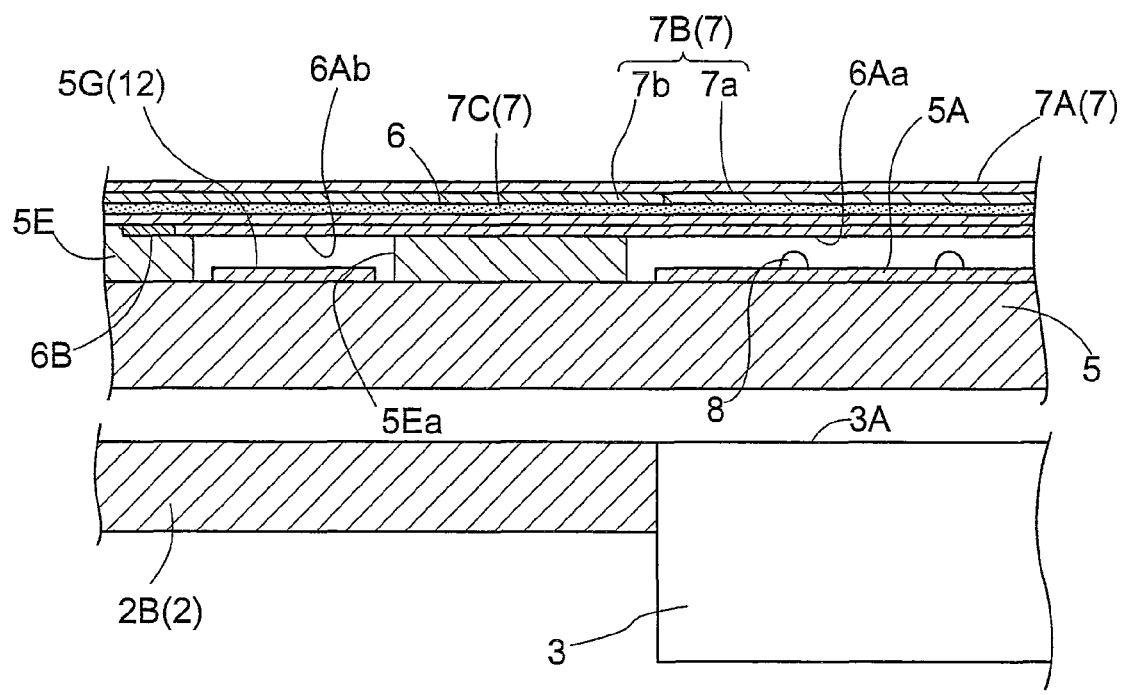
FIG. 3 is a longitudinal sectional view of a relevant portion showing a configuration of the protection panel.

Referring to FIGS. 2-4 and (a) of FIG. 5, as the rear substrate 5, a resin plate may be used which exhibits excellent transparency, rigidity, and workability, such as polycarbonate resin (PC), methacrylic resin (PMMA), acrylonitrile-styrene copolymer resin (AS), acrylonitrile-butadiene-styrene copolymer resin (ABS), cellulose propionate resin (CP), polystyrene resin (PS), polyester resin and polyethylene resin (PE). Especially, polycarbonate resin (PC) and methacrylic resin (PMMA), which are excellent in transparency, may be preferably used. The thickness of the resin plate may be selected from a range of 0.5-3.0 mm, and preferably is 1.0 mm.

In addition, as the rear substrate 5, a glass plate may be used which exhibits excellent strength and transmissivity, such as soda glass, borosilicate glass and toughened glass. By using a glass plate which is excellent in a strength, it becomes possible to reduce a thickness of the protection panel A by reducing a thickness of the rear substrate 5, and thus to reduce a thickness of the mobile-phone 1 having the protection panel A.=The thickness of the glass plate may be selected from a range of 0.2-3.0 mm, and preferably is 1.0 mm.

In a center portion of a lower rim portion of the rear substrate 5, four through-holes 5a,5b for electric conduction, each penetrating through the rear substrate 5 from the front face to a rear face, are aligned in a transversal direction at predetermined intervals. On the front face of the rear substrate 5, in addition to the transparent resistive film 5A, there are formed: a pair of bus bars 5B arranged in parallel on opposing sides of the transparent resistive film 5A in an X-direction; a routing circuit 5C around the resistive film 5A; a pair of terminals 5D for the respective bus bars 5B, located at positions corresponding to the positions of the through holes 5a; an adhesion layer 5E in a shape of a frame; and the like.

With respect to the rear substrate 5, instead of forming the transparent resistive film 5A, the bus bars 5B, the routing circuit 5C, the terminals 5D, the adhesive layer 5E in a shape of a frame and the like directly on the front face, a transparent insulation film having these formed thereon may be separately prepared and attached to the front face of the rear substrate 5 to thereby prepare the rear substrate 5 having the transparent resistive film 5A, the bus bars 5B, the routing circuit 5C, the terminals 5D, the adhesive layer 5E in a shape of a frame, and the like, all formed on the front face of the rear substrate 5.

In the case where the transparent insulation film is used, examples of the transparent insulation film include those made of engineering plastics, such as polycarbonates, polyamides, and polyetherketone; and resin films, such as those made of acrylic, polyethylene terephthalate and polybutylene terephthalate.

As shown in FIGS. 2-4 and (b) of FIG. 5, as the front substrate 6, a flexible transparent insulation film is used that is deflectable when pressed by a finger or the like. Examples of the flexible transparent insulation film include those made of engineering plastics, such as polycarbonates, polyamides and polyetherketones; and resin films, such as those made of acrylic, polyethylene terephthalate and polybutylene terephthalate.

On the rear face of the front substrate 6, in addition to the transparent resistive film 6A, there are formed: a pair of bus bars 6B arranged in parallel on opposing sides of the transparent resistive film 6A in a Y-direction; a pair of routing circuits 6C located at positions around the transparent resistive film 6A; a pair of terminals 6D for the respective bus bars 6B, facing the corresponding through-holes 5b, and the like. On a front face of the front substrate 6, a design sheet 7 is laminated.

Each of the transparent resistive films 5A,6A is a transparent conductive film made of: a film of metal oxide, such as tin oxide, indium oxide, antimony oxide, zinc oxide, cadmium oxide, and indium tin oxide (ITO); composite films mainly composed of these metal oxides; or a film of metal, such as gold, silver, copper, tin, nickel, aluminum, and palladium. It should be noted that each of the transparent resistive films 5A,6A may be formed as a multilayer with two or more layers. Examples of a method for forming each of the transparent resistive films 5A,6A include vacuum deposition method, sputtering method, ion plating method, and CVD method.

On a front face of either of the transparent resistive films 5A,6A, a plurality of fine dot-shaped spacers 8 may be formed, in order to prevent erroneous contact between the transparent resistive films 5A,6A when they are arranged opposingly. Herein, the spacers 8 are formed on the transparent resistive film 5A of the rear substrate 5.

Examples of the spacer 8 include: a transparent light curing resin, such as epoxy acrylates and urethane acrylates, and a transparent thermosetting resin, such as polyesters and epoxys. As a fabrication method of the spacer 8, there can be mentioned a printing method, such as screen printing, and photoprocess.

Each of the bus bars 5B,6B, each of the routing circuits 5C,6C, and each of the terminals 5D,6D may be made of a conductive paste of metals, e.g., gold, silver, copper and nickel, or of carbon. Examples of a method for fabricating each of the bus bars 5B,6B, each of the routing circuits 5C,6C, and each of the terminals 5D,6D include printing method, such as screen printing, offset printing, gravure printing, and flexographic printing; photoresist method; and brush painting method.

The bus bar 5B(6B) is typically formed at a position as close as possible to an edge of the rear substrate 5 (the front substrate 6), so as to secure a region where the rectangular transparent resistive films 5A,6A face each other as large as possible at a middle portion of the rear substrate 5 (the front substrate 6). A size and a shape of the region where the rectangular transparent resistive films 5A,6A face each other, in other words, an input area or display area, may vary depending on a size and a shape of an input area or display area of the electronic device B, such as the mobile-phone 1.

The design sheet 7 may include: a transparent film 7A made of engineering plastic, such as polycarbonates, polyamides and polyetherketones, or made of acrylic, polyethylene terephthalate, polybutylene terephthalate or the like; and a decorative layer 7B and an the adhesive layer 7C which are formed on a rear face of the transparent film 7A. The thickness of the transparent film 7A may be selected from a range of 25-200 μm. In addition, a hard coating layer (not shown) may be foamed on a front face of the transparent film 7A (not shown).

Examples of a material for the hard coating layer include inorganic material, such as siloxane resin, and organic material, such as thermosetting resin containing acrylic epoxy or urethane, and light curing resin, containing acrylate. A suitable thickness of the hard coating layer is approximately 1-7 μm. Examples of a method for fabricating the hard coating layer include coating method, such as roll coating and spray coat, and regular printing method, such as screen printing, offset printing, gravure printing and flexographic printing.

The hard coating layer may be directly formed on the front face of the transparent film 7A on whose rear face the decorative layer 7B and the adhesive layer 7C are directly formed, or alternatively, the hard coating layer may be formed on a separate transparent film different from the transparent film 7A on whose rear face the decorative layer 7B and the adhesive layer 7C are directly formed, and these films may be attached together.

With respect to the design sheet 7, a nonglare treatment may be performed in order to prevent light reflection. For example, an emboss-like pattern may be formed, or alternatively, fine particles as extender pigment, such as silica and alumina, may be mixed in the hard coating layer.

The decorative layer 7B is provided with a decorative portion 7b in a shape of a frame so that a rectangular transparent portion 7a is formed at a center of the decorative layer 7B. A size and the shape of the transparent portion 7a may vary depending on the size and shape of the region where the rectangular transparent resistive films 5A,6A face each other, in other words, the size and the shape of the input area or display area of the electronic device B, such as the mobile-phone 1.

By forming the decorative layer 7B in this manner, a rim portion 6E of the front substrate 6 is provided with decoration that can hide the bus bars 5B,6B and the like of the rear substrate 5 and the front substrate 6. With this configuration, there is no need to provide a frame portion in the display window 2Aa of the housing 2 for the purpose of hiding the bus bar 5B of the rear substrate 5, the bus bar 6B of the front substrate 6 and the like, and by that amount, the thickness of the mobile-phone 1 can be reduced.

For the decorative layer 7B, a colored ink is preferably used, and examples of which include: polyvinyl resin, polyamide resin, polyester resin, polyacrylic resin, polyurethane resin, polyvinyl acetal resin, polyester urethane resin, or alkyd resin as a binder; and pigment or dye of an appropriate color as a coloring agent. It should be noted that the rectangular transparent portion 7a may have the decorative layer 7B formed with transparent ink, or may not have the decorative layer 7B and the transparent portion 7a is served as-is.

Examples of a method for fabricating the decorative layer 7B include regular printing method, such as screen printing, offset printing, gravure printing, and flexographic printing. Especially, for polychrome printing and gradation expression, the offset printing and the gravure printing are suitable.

The decorative layer 7B may also be a metal film layer, or a combination of a picture print layer and a metal film layer. The metal film layer as the decorative layer 7B is for expressing metallic luster and is formed by vacuum deposition method, sputtering method, ion plating method, plating method or the like. In this case, depending on the desired color of metallic luster, a metal may be selected from, for example, aluminum, nickel, gold, platinum, ferrochrome, copper, tin, indium, silver, titanium, lead, zinc, and alloys or compounds thereof. Typically, a thickness of the metal film layer is approximately 0.05 μm. Moreover, upon forming the metal film layer, a front anchor layer or a rear anchor layer may be provided for the purpose of enhancing adhesiveness with other layers.

For the adhesive layer 7C, a thermosensitive or pressure-sensitive resin is appropriately selected. For example, when the front substrate 6 and the design sheet 7 are made of polycarbonates or polyamides, the adhesive layer 7C may be made of polyacrylic resin, polystyrene resin, polyamide resin or the like. When the front substrate 6 and the design sheet 7 are made of acrylic or polyethylene terephthalate, the adhesive layer may be made of vinyl chloride, vinyl acetate, acrylic copolymer or the like.

Examples of a method for fabricating the adhesive layer 7C include regular printing method, such as screen printing, offset printing, gravure printing, and flexographic printing.

The front substrate 6 may not be provided with the design sheet 7. In the case where the design sheet 7 is not present, a hard coating layer may be formed on the front face of the front substrate 6. In the case where the design sheet 7 is not present and a nonglare treatment is performed, an emboss-like pattern may be formed on the front face of the front substrate 6 or the hard coating layer, or alternatively, fine particles as extender pigment, such as silica and alumina, may be mixed in the hard coating layer.

As shown in FIG. 4, the rear housing part 2B is equipped with four spring connector pins 9 at positions opposing to the respective through-holes 5a,5b of the rear substrate 5. Each of the spring connector pins 9 is conductively connected to an interface (not shown) of the display device 3.

Each of the terminals 5D of the rear substrate 5 and the terminals 6D of the front substrate 6 is conductively connected to the corresponding spring connector pin 9, utilizing the corresponding through-hole 5a,5b of the rear substrate 5.

Into each of the through-holes 5a,5b, a conductive adhesive 10 made of a conductive paste is injected so as to be conductively brought into contact with the corresponding terminal 5D,6D, and a conductive pin 11 having a head portion is inserted in such a manner that one end portion 11A is conductively brought into contact with the conductive adhesive 10.

On the other end portion 11B of each conductive pin 11, a head portion 11B in a shape of a disk is formed, and when the conductive pin 11 is fully inserted into the corresponding through-hole 5a,5b, the head portion 11B is exposed on a rear face of the front housing part 2A. With this configuration, a touch input signal from each of the transparent resistive films 5A,6A or the like can be taken out to a rear face side of the front housing part 2A. When the front housing part 2A and the rear housing part 2B are joined, the head portion 11B of each conductive pin 11 functions as flat terminal 5F(6F) for connecting the terminal 5D of the rear substrate 5 (the terminal 6D of the front substrate 6) to the corresponding spring connector pin 9. With this configuration, a touch input signal from each of the transparent resistive films 5A,6A can be input to the display device 3.

A diameter of each of the through-holes 5a,5b preferably is 0.1-2.0 mm. When the diameter of each through-hole 5a is below 0.1 mm, it may become impossible to secure conduction in each through-hole 5a. When the diameter of each through-hole 5a is above 2.0 mm, the conductive adhesive 10 may not be excellently injected into each of the through-holes 5a,5b, and amount of the conductive adhesive 10 may become larger, leading to poor cost performance.

Examples of the conductive paste used for the conductive adhesive 10 include silver paste and copper paste. Examples of a method for injecting the conductive adhesive 10 includes coating using a dispenser and screen printing. In addition to the injection of the conductive adhesive 10, a film made of nickel or the like may be formed on the inner wall of each of the through-holes 5a,5b, by non-electrolytic plating or electrolytic plating.

The head portion 11B of the conductive pin 11 has a thickness of 20-200 μm. Instead of having the head portion 11B, the conductive pin 11 may be a female type having a recess, or a male type having a protrusion. For the conductive pin 11, there can be mentioned a metal pin made of copper, iron, nickel, aluminum, or stainless steel. In the conductive pin 11, it is preferable that gold plating is applied to at least both end portions which come into contact with the conductive adhesive 10 or the spring connector pin 9.

Instead of the conductive pin 11, there may be used a flexible print circuit formed of a polyamide film on whose one side a circuit made of copper foil is fabricated.

As shown in (b) of FIG. 5, on the front substrate 6, the transparent resistive film 6A is formed to have an expanded region 6Ab adjacent on a lower side to a facing region 6Aa facing the transparent resistive film 5A, with a distance between a pair of the bus bars 6B widened to the lower side. The routing circuits 6C for the respective terminals 6D in the front substrate 6 are configured to make the shortest route from the respective bus bars 6B.

As shown in (a) of FIG. 5, on the rear substrate 5, in a portion facing the expanded region 6Ab, three contact points 5G and two resistors 5H are formed at predetermined intervals in the X-direction in such a manner that the resistor 5H is positioned between two adjacent contact points 5G. In addition, the routing circuit 5C for the terminal 5D on the rear substrate 5 has a circuit portion 5Ca so as to make the three contact points 5G and the two resistors 5H arranged in parallel with the transparent resistive film 5A.

When the rear substrate 5 and the front substrate 6 are connected, each of the contact points 5G is arranged opposingly with a predetermined gap to the expanded region 6Ab. The adhesive layer 5E of the rear substrate 5 is configured to have openings 5Ea which allow each of the contact points 5G and the expanded region 6Ab that face each other to be brought into contact with each other.

In other words, the contact point 5G and the expanded region 6Ab that face each other form a switch 12 for detecting the contact therebetween, based on a voltage detected in the terminals (6D or 5D) of one the rear substrate 5 and the front substrate 6, when a voltage is applied between the terminals (5D or 6D) of the other.

With this configuration of the switch 12, the same terminal 5D can be shared with the analog coordinate input part Aa, in other words, there is no need to additionally form a terminal specialized for switch, a corresponding routing circuit and the like, around the transparent resistive film 5A(6A) of the rear substrate 5 (front substrate 6). Therefore, growth in size of the protection panel A and growth in complexity of the circuit configuration can be prevented which may otherwise be caused by the additional formation of a terminal specialized for switch, a corresponding routing circuit and the like around the transparent resistive film 5A,6A.

In the protection panel A having such a switch 12, in the case where a voltage is applied between the terminals 5D of the rear substrate 5, when a touch operation is performed on any of the switches 12, the X coordinate of the switch 12 on which the touch operation is performed can be obtained, based on a magnitude of a voltage output from the terminal 6D of the front substrate 6. When a touch operation is performed on the analog coordinate input part Aa where the transparent resistive films 5A,6A face each other, the X coordinate of the touch operation position in the analog coordinate input part Aa can be obtained, based on a magnitude of a voltage output from the terminal 6D of the front substrate 6.

In the case where a voltage is applied between the terminals 6D of the front substrate 6, when a touch operation is performed on any of the switches 12, the ON state of the switch 12 can be recognized, based on a magnitude of a voltage output from the terminal 5D of the rear substrate 5. When a touch operation is performed on the analog coordinate input part Aa, the Y coordinate of the touch operation position in the analog coordinate input part Aa can be obtained, based on a magnitude of a voltage output from the terminal 5D of the rear substrate 5.

In other words, when a touch operation is performed on any of the switches 12, based on the X coordinate of the touch operation position obtained by applying a voltage between the terminals 5D of the rear substrate 5 and the ON information of the touch operation obtained by applying a voltage between the terminals 6D of the front substrate 6, the switch 12 on which the touch operation is performed can be specified. In addition, when a touch operation is performed on the analog coordinate input part Aa, based on the X coordinate of the touch operation position obtained by applying a voltage between the terminals 5D of the rear substrate 5 and the Y coordinate of the touch operation position obtained by applying a voltage between the terminals 6D of the front substrate 6, the touch operation position in the analog coordinate input part Aa can be specified.

Each of the contact point 5G may be made of a conductive paste of metals, e.g., gold, silver, copper and nickel, or of carbon. Examples of a method for fabricating each of the contact points 5G include printing method, such as screen printing, offset printing, gravure printing, and flexographic printing; photoresist method; and brush painting method.

Each of the resistors 5H may be made of: a film of metal oxide, such as tin oxide, indium oxide, antimony oxide, zinc oxide, cadmium oxide, and indium tin oxide (ITO); composite films mainly composed of these metal oxides; or a film of metal, such as gold, silver, copper, tin, nickel, aluminum, and palladium. Examples of a method for fabricating each of the resistors 5H include vacuum deposition method, sputtering method, ion plating method, and CVD method.

As shown in FIG. 1, in the design sheet 7, a picture 7c is formed which depicts the switches 12 at positions in the decorative portion 7b of the decorative layer 7B corresponding to the positions of the contact points 5G.

Hereinbelow, with reference to FIGS. 2-5, the configuration of the protection panel A with touch input function illustrated in the present embodiment will be described in detail.

First, on one side of a rolled-up flexible transparent insulation film formed of a polyethylene terephthalate film (hereinafter, simply referred to as "PET film") having a thickness of 75 μm, an indium tin oxide film (hereinafter, simply referred to as "ITO film") is formed by sputtering.

Next, the PET film is cut into a sheet so as to have a predetermined 2-dimensional size, and then etching resist is applied onto the ITO film by screen printing, and unnecessary portions of the ITO film are removed by sulfuric acid to thereby form the rectangular transparent resistive film 6A.

After the etching, the resist is removed by alkaline washing, and on the opposing sides of the transparent resistive film 6A in the Y-direction are formed a pair of the bus bars 6B arranged in parallel, and around the transparent resistive film 6A are formed a pair of the routing circuits 6C and a pair of the terminal 6D, by screen printing using a silver paste. The routing circuits 6C are set so that the routing circuit 6C passes the shortest route. The arrangement of a pair of the terminals 6D is set in such a manner that they are aligned in the traverse direction at predetermined intervals in a lower rim portion of the PET film.

With this configuration, the front substrate 6 having the transparent resistive film 6A, a pair of the bus bars 6B, a pair of the routing circuits 6C and a pair of the terminals 6D, on the rear face thereof can be obtained (see (b) of FIG. 5).

Meanwhile, on one side of a polycarbonate plate having a thickness of 1.0 mm, which is formed so as to have the same 2-dimensional size as that of the front substrate 6, an ITO film is formed by sputtering.

Then, etching resist in a pattern is applied onto the ITO film by screen printing, and unnecessary portions of the ITO film are removed by sulfuric acid to thereby form the rectangular transparent resistive film 5A and the two resistors 5H. The size of the transparent resistive film 5A in the Y-direction is approximately ⅘ as short as that of the transparent resistive film 6A of the front substrate 6, and a lower end of the transparent resistive film 5A is positioned inward by that amount relative to the transparent resistive film 6A. The arrangement of the two resistors 5H is set in such a manner that they are aligned in the traverse direction at predetermined intervals between a lower rim portion of the polycarbonate plate and the transparent resistive film 5A.

Next, a plurality of the fine dot-shaped spacers 8 are formed on a whole surface of the transparent resistive film 5A, by screen printing using an epoxy acrylate thermosetting resin. In addition, on the opposing sides of the transparent resistive film 5A in the X-direction are formed a pair of the bus bars 5B arranged in parallel, and around the transparent resistive film 5A are formed the routing circuit 5C, a pair of the terminals 5D and the three contact points 5G, by screen printing using a silver paste. The arrangement of the three contact points 5G are set in such a manner that they are aligned in the traverse direction at predetermined intervals and the resistor 5H is positioned between two adjacent contact points 5G, and that they face the expanded region 6Ab of the front substrate 6. The route of the routing circuit 5C is set so that the routing circuit 5C from the corresponding bus bar 5B makes the shortest route, and that the circuit portion 5Ca connecting these routes is provided therebetween, in other words, the two resistors 5H and the three contact points 5G are connected in the transversal direction in the above-described order through the circuit portion 5Ca, in parallel with the transparent resistive film 5A. The arrangement of a pair of the terminals 5D is set in such a manner that they are aligned in the traverse direction at predetermined intervals in the left lower rim portion of the polycarbonate plate, and that positions thereof correspond to positions rightward of the terminal 6D of the front substrate 6 at predetermined intervals.

Then, an adhesive ink mainly composed of acrylic acid ester is applied onto the rim portion of the polycarbonate plate by screen printing, so as not to cover each of the contact points 5G, to thereby form the adhesive layer 5E in a shape of a frame. In addition, in the center portion of the lower rim portion, the four through-holes 5a,5b are formed with a drill in such a manner that they are aligned along the lower rim of the polycarbonate plate. The arrangement of the four through-holes 5a,5b is set in such a manner that two of the through-holes 5a penetrate the respective terminals 5D, and the remaining two of the through-holes 5b face the respective terminals 6D of the front substrate 6.

With this configuration, the rear substrate 5 having the transparent resistive film 5A, a pair of the bus bars 5B, the three contact points 5G, the two resistors 5H, the routing circuit 5C arranged in parallel, a pair of the terminals 5D and the adhesive layer 5E, on the front face thereof can be obtained (see (a) of FIG. 5).

It should be noted that, when the contact point 5G is desired to have light permeability, the same material and the same method as those for the resistor 5H may be used.

Next, a rolled-up transparent film formed of the PET film having a thickness of 125 μm is cut into a sheet so as to have the same 2-dimensional size as those of the front substrate 6 and the rear substrate 5, and on one side thereof, there are formed by gravure printing: the decorative layer 7B provided with the rectangular transparent portion 7a in the center and the decorative portion 7b in a shape of a frame that surrounds the rectangular transparent portion 7a; and the adhesive layer 7C made of a transparent adhesive mainly composed of acrylic acid ester.

In this fabrication, the picture 7c is foamed which depicts the switches 12 at positions on the decorative portion 7b corresponding to the positions of the contact points 5G of the rear substrate 5.

With this configuration, the design sheet 7 can be obtained which is provided with the decorative layer 7B and the adhesive layer 7C on a rear face.

Then, the whole surfaces of the obtained design sheet 7 and front substrate 6 are stuck together in such a manner that a face with no ITO film (front face) of the front substrate 6 is opposed to a face with a decorative layer (rear face) of the design sheet 7 through the adhesive layer 7C of the design sheet 7, and that the position of the expanded region 6Ab in the front substrate 6 corresponds to the position of the picture 7c in the design sheet 7.

With this configuration, the front substrate 6 having the rim portion 6E provided with decoration including the picture 7c for switch can be obtained.

Then, the front substrate 6 laminated with the design sheet 7 is stuck to the rear substrate 5 through the adhesive layer 5E of the rear substrate 5, in such a manner that the transparent resistive film 5A and the contact points 5G are opposed to the transparent resistive film 6A through an air layer, the bus bars 5B,6B are arranged orthogonal to each other, and the terminal 6D of the front substrate 6 closes a front side of the corresponding through-hole 5b.

Next, on a terminal 5D(6D) side in the through-hole 5a(5b), a silver paste as the conductive adhesive 10 is injected with a dispenser.

After the injection, by ultrasonic melting using a ultrasonic press-fitting device, the conductive pin 11 having the head portion is press-fitted into each of the through-holes 5a,5b in such a manner that the one end portion 11A reaches the conductive adhesive 10, to thereby form the flat terminal 5F(6F) that allows a conductive connection between the terminal 5D of the rear substrate 5 (the terminal 6D of the front substrate 6) and the corresponding spring connector pin 9 provided on the rear housing part 2B, and to allow a touch input signal from the transparent resistive films 5A,6A and the contact point 5G to be taken out.

With this configuration, the protection panel A provided with the analog coordinate input part Aa and the three switches 12 can be obtained (see FIGS. 1-5).

(Second Embodiment)

Hereinbelow, a second embodiment in which the protection panel A with touch input function according to the present invention is applied to the mobile-phone 1 as one example of the electronic device B will be described with reference to the drawings.

It should be noted that, in the second embodiment, the arrangement and configuration of the switch 12 in the protection panel A are different from those of the first embodiment, while other configurations are the same as those of the first embodiment. Accordingly, only differences from the first embodiment will be described with reference to FIG. 6.

The drawing (b) of FIG. 6 is the same as the drawing (b) of FIG. 5. As shown in (a) of FIG. 6, in the rear substrate 5, at a position facing the expanded region 6Ab, a transparent resistive film 5J in a form of a strip is formed, instead of the three contact points 5G and the two resistors 5H of the first embodiment. The routing circuits 5C correspond to a pair of the terminals 5D of the rear substrate 5 are configured to allow the transparent resistive film 5A and the transparent resistive film 5J to be arranged in parallel.

When the rear substrate 5 and the front substrate 6 are connected, the strip-shaped transparent resistive film 5J is arranged opposingly with a predetermined gap to the expanded region 6Ab. The adhesive layer 5E of the rear substrate 5 is configured to have the three openings 5Ea which allow the transparent resistive film 5J and the expanded region 6Ab that face each other to be brought into contact with each other.

In other words, the strip-shaped transparent resistive film 5J and the expanded region 6Ab that face each other form the switch 12 for detecting the contact therebetween, based on a voltage detected in the terminals (6D or 5D) of one of the rear substrate 5 and the front substrate 6, when a voltage is applied between the terminals (5D or 6D) of the other. It should be noted that the transparent resistive film 5J may have a shape other than a strip.

With this configuration of the switch 12, the same terminal 5D can be shared with the analog coordinate input part Aa, in other words, there is no need to additionally form a terminal specialized for switch, a corresponding routing circuit and the like, around the transparent resistive film 5A(6A) of the rear substrate 5 (front substrate 6). Therefore, growth in size of the protection panel A and growth in complexity of the circuit configuration can be prevented which may otherwise be caused by the additional formation of a terminal specialized for switch, a corresponding routing circuit and the like around the transparent resistive film 5A,6A. Furthermore, since the switch 12 can be made transparent, design freedom can be enhanced by arranging light, LED, LCD or the like behind the switch 12.

The strip-shaped transparent resistive film 5J may be a transparent conductive film made of: a film of metal oxide, such as tin oxide, indium oxide, antimony oxide, zinc oxide, cadmium oxide, and indium tin oxide (ITO); composite films mainly composed of these metal oxides; or a film of metal, such as gold, silver, copper, tin, nickel, aluminum, and palladium. It should be noted that the transparent resistive film 5J may be formed as a multilayer with two or more layers. Examples of a method for fabricating the transparent resistive film 5J include vacuum deposition method, sputtering method, ion plating method, and CVD method.

A shown in FIG. 1, in the design sheet 7, the picture 7c is formed which depicts the switches 12 at positions on the decorative portion 7b of the decorative layer 7B corresponding to the positions of the openings 5Ea in the adhesive layer 5E.

Hereinbelow, with reference to FIG. 6, the configuration of the protection panel A with touch input function illustrated in the present embodiment will be described in detail.

First, etching resist in a pattern is applied onto the ITO film on the PET film by screen printing, and unnecessary portions of the ITO film are removed by sulfuric acid to thereby form the rectangular transparent resistive film 6A.

After the etching, the resist is removed by alkaline washing, and on the opposing sides of the transparent resistive film 6A in the Y-direction are formed a pair of the bus bars 6B arranged in parallel, and around the transparent resistive film 6A are formed a pair of the routing circuits 6C and a pair of electrodes 6D, by screen printing using a silver paste. The routing circuits 6C are set so that the routing circuit 6C passes the shortest route. The arrangement of a pair of the electrodes 6D is set in such a manner that they are aligned in the traverse direction at predetermined intervals in the lower rim portion of the PET film.

With this configuration, the front substrate 6 having the rectangular transparent resistive film 6A, a pair of the bus bars 6B, a pair of the routing circuits 6C and a pair of the electrodes 6D, on the rear face thereof can be obtained (see (b) of FIG. 6).

Meanwhile, on one side of a polycarbonate plate having a thickness of 1.0 mm, which is formed so as to have the same 2-dimensional size as that of the front substrate 6, an ITO film is formed by sputtering.

Then, etching resist in a pattern is applied onto the ITO film by screen printing, and unnecessary portions of the ITO film are removed by sulfuric acid to thereby form the rectangular transparent resistive film 5A and the strip-shaped transparent resistive film 5J. The size of the rectangular transparent resistive film 5A in the Y-direction is approximately ⅘ as short as that of the transparent resistive film 6A of the front substrate 6, and the lower end of the transparent resistive film 5A is positioned inward by that amount relative to the transparent resistive film 6A. The strip-shaped transparent resistive film 5J is set in such a manner that it is arranged along the X-direction between the lower rim portion of the polycarbonate plate and the transparent resistive film 5A, and that a length thereof is the same as the size of the rectangular transparent resistive film 5A in the Y-direction.

Next, a plurality of the fine dot-shaped spacers 8 are formed on the whole surface of the transparent resistive film 5A, by screen printing using an epoxy acrylate thermosetting resin. In addition, on the opposing sides of the transparent resistive films 5A,5J in the Y-direction are formed a pair of the bus bars 5B arranged in parallel, and around the transparent resistive films 5A,5J are formed the routing circuit 5C and a pair of the electrodes 5D, by screen printing using a silver paste. A pair of the bus bars 5B arranged in parallel linearly extend from the opposing sides of the rectangular transparent resistive film 5A arranged in the X-direction to the respective opposing sides of the strip-shaped transparent resistive film 5J arranged in the X-direction, that is, the arrangement of the bus bars 5B is set in such a manner that the transparent resistive film 5A and the transparent resistive film 5J are arranged in parallel. In addition, the arrangement of the strip-shaped transparent resistive film 5J is set so that the transparent resistive film 5 faces the expanded region 6Ab of the front substrate 6. The route of each routing circuit 5C is set so that the routing circuit 5C from the corresponding bus bar 5B makes the shortest route. The arrangement of a pair of the terminals 5D is set in such a manner that they are aligned in the traverse direction at predetermined intervals in the left lower rim portion of the polycarbonate plate, and that positions thereof correspond to positions rightward of the terminal 6D of the front substrate 6 at predetermined intervals.

Then, an adhesive ink mainly composed of acrylic acid ester is applied onto the rim portion of the polycarbonate plate by screen printing, so as not to cover three circular regions aligned in the traverse direction at predetermined intervals above the strip-shaped transparent resistive film 5J, to thereby form the adhesive layer 5E in a shape of a frame. In addition, in the center portion of the lower rim portion, the four through-holes 5a,5b are formed with a drill in such a manner that they are aligned along the lower rim of the polycarbonate plate. The arrangement of the four through-holes 5a,5b is set in such a manner that two of the through-holes 5a penetrate the respective terminals 5D, and the remaining two of the through-holes 5b face the respective terminals 6D of the front substrate 6.

With this configuration, the rear substrate 5 having the transparent resistive films 5A,5J, a pair of the bus bars 5B, a pair of the routing circuits 5C, a pair of the electrodes 5D and the adhesive layer 5E, on the front face thereof can be obtained (see (a) of FIG. 6).

Next, on one side of the PET film, there are formed by gravure printing: the decorative layer 7B provided with the rectangular transparent portion 7a in the center and the decorative portion 7b in a shape of a frame that surrounds the rectangular transparent portion 7a; and the adhesive layer 7C made of a transparent adhesive mainly composed of acrylic acid ester.

In this fabrication, a picture 7d is formed which depicts the switches 12 at positions on the decorative portion 7b corresponding to the positions of the openings 5Ea of the adhesive layer 5E of the rear substrate 5.

With this configuration, the design sheet 7 can be obtained which is provided with the decorative layer 7B and the adhesive layer 7C on the rear face.

Then, the whole surfaces of the obtained front substrate 6 and design sheet 7 are stuck together in such a manner that a face with no ITO film (front face) of the front substrate 6 is opposed to a face with a decorative layer (rear face) of the design sheet 7 through the adhesive layer 7C of the design sheet 7, and that the position of the expanded region 6Ab in the front substrate 6 corresponds to the position of the picture 7c in the design sheet 7.

With this configuration, the front substrate 6 having the rim portion 6E provided with decoration including the picture 7c for switch can be obtained.

Then, the front substrate 6 laminated with the design sheet 7 is stuck to the rear substrate 5 through the adhesive layer 5E of the rear substrate 5, in such a manner that the rectangular transparent resistive films 5A,5J are opposed to the transparent resistive film 6A through an air layer, the bus bars 5B,6B are arranged orthogonal to each other, and the electrode 6D of the front substrate 6 closes the front side of the corresponding through-hole 5b.

Next, on an electrode 5D(6D) side in the through-hole 5a(5b), a sliver paste as the conductive adhesive 10 is injected with the dispenser.

After the injection, by ultrasonic melting using a ultrasonic press-fitting device, the conductive pin 11 having the head portion is press-fitted into each of the through-holes 5a,5b in such a manner that the one end portion 11A reaches the conductive adhesive 10, to thereby form the flat terminal 5F(6F) that allows a conductive connection between the electrode 5D of the rear substrate 5 (the electrode 6D of the front substrate 6) and the corresponding spring connector pin 9 provided on the rear housing part 2B, and to allow a touch input signal from the rectangular transparent resistive films 5A,6A and the strip-shaped transparent resistive film 5J to be taken out.

With this configuration, the protection panel A provided with the analog coordinate input part Aa and the three switches 12 can be obtained (see FIG. 1).

(Other Embodiments)

(1) A number of the switch 12 provided in the protection panel A may vary. For example, an array formed of a single switch 12 may be provided in the protection panel A (see FIG. 7), or alternatively, an array formed of two, four or more switches 12 may be provided. In the case where a plurality of the switches 12 are formed of a plurality of the contact points 5G, the resistor 5H is provided between two adjacent contact points 5G.

It should be noted that, in the case of the protection panel A having a single switch 12, unlike the first and second embodiments, it is not specified on which switch 12 the touch operation is performed. In other words, in this case, only the ON/OFF of the switch 12 is recognized, based on a magnitude of a voltage output from the terminal 5D of the rear substrate 5 obtained by applying a voltage between the terminals 6D of the front substrate 6.

(2) In addition, the arrangement of the switched 12 provided in the protection panel A may be modified in the following manner. For example, the switches 12 may be formed so as to align along both upper and lower edges of the protection panel A. In other words, the transparent resistive film 6A has two expanded regions 6Ab so as to sandwich the facing region 6Aa that faces the transparent resistive film 5A, and both the expanded regions 6Ab face the contact points 5G (see FIG. 8) or the strip-shaped transparent resistive films 5J (see FIG. 9). Moreover, the switches 12 may be provided only in an upper rim portion of the protection panel A.

Furthermore, a plurality of arrays of the switch 12 may be provided in one of the upper rim portion and the lower rim portion of the protection panel A. In other words, the number of the arrays of the circuit portion including the contact points 5G in parallel with the transparent resistive film 5A may be two or more (see FIG. 10).

It should be noted that, in the case of the protection panel A having two or more arrays of the switch 12, when a touch operation is performed on any of the switches 12, unlike the first and second embodiments, the switch 12 on which the touch operation is performed is specified based on the X coordinate of the touch operation position obtained by applying a voltage between the terminals 5D of the rear substrate 5, and the Y coordinate of the touch operation position obtained by applying a voltage between the terminals 6D of the front substrate 6.

Figure 11:
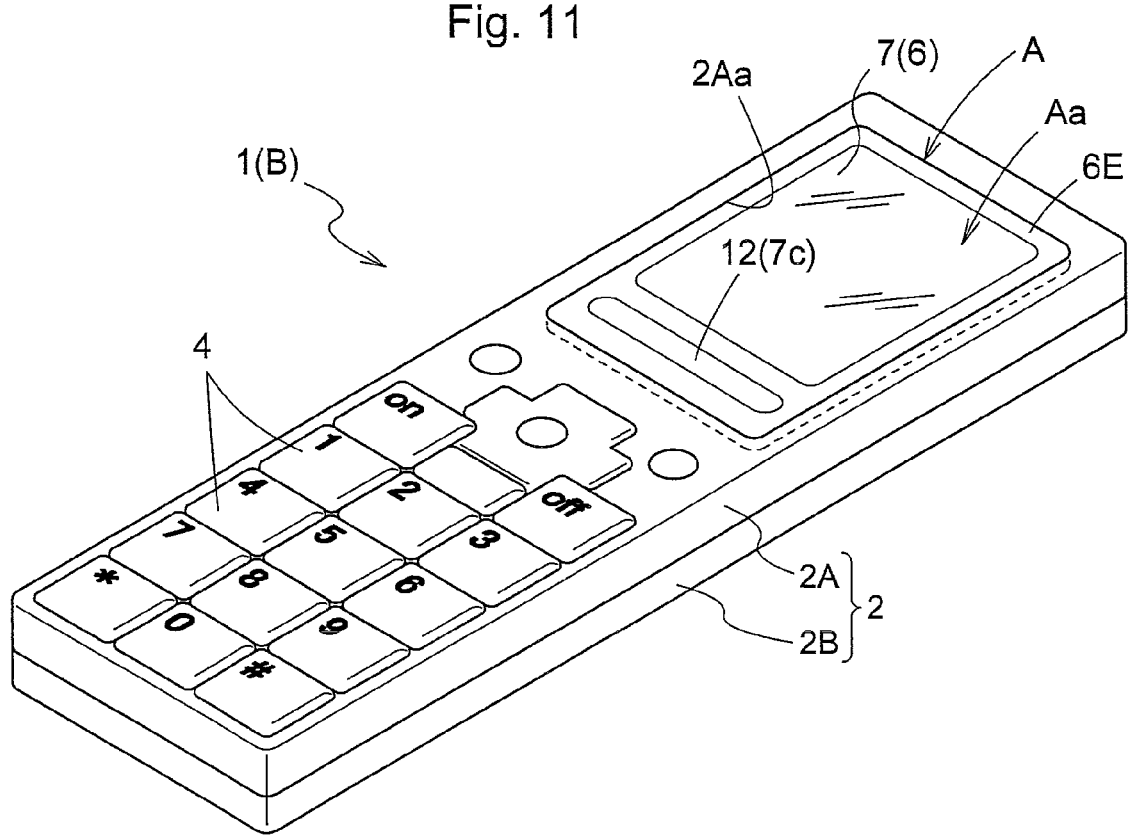
FIG. 11 is a perspective view of a mobile-phone having a variable switch.

(3) In addition, the switch 12 provided in the protection panel A may be modified as variable type (see FIG. 11). For example, in the second embodiment, the adhesive layer 5E in a shape of a frame may be formed so as not to cover the strip-shaped transparent resistive film 5J (see FIG. 12). In this case, it is preferable that the dot-shaped spacers 8 are formed also on the strip-shaped transparent resistive film 5J. In addition, in the first embodiment, the intervals between the contact points 5G may be made shorter, so as to make an entire group of the contact points 5G as a variable switch. Further, the protection panel A may be provided with both the switch 12 and the variable switch 12.

When the protection panel A is mounted in the electronic device B having a camera function, such as digital camera, the variable switch 12 may be used as a zoom switch or the like for altering a focal length based on a magnitude of a voltage which is changed in accordance with a position of a touch operation to the variable switch 12, or a direction of a voltage which is changed in accordance with a slide touch operation to the variable switch 12. When the protection panel A is mounted in the electronic device B having a music player function, such as portable music player, the variable switch 12 may be used as a volume switch or the like for altering a sound volume based on a magnitude of a voltage which is changed in accordance with a position of a touch operation to the variable switch 12, or a direction of a voltage which is changed in accordance with a slide touch operation to the variable switch 12.

Therefore, a switch suitable for the function of the electronic device in which the protection panel is mounted can be provided, and operability of the electronic device can be enhanced.

Figure 13:
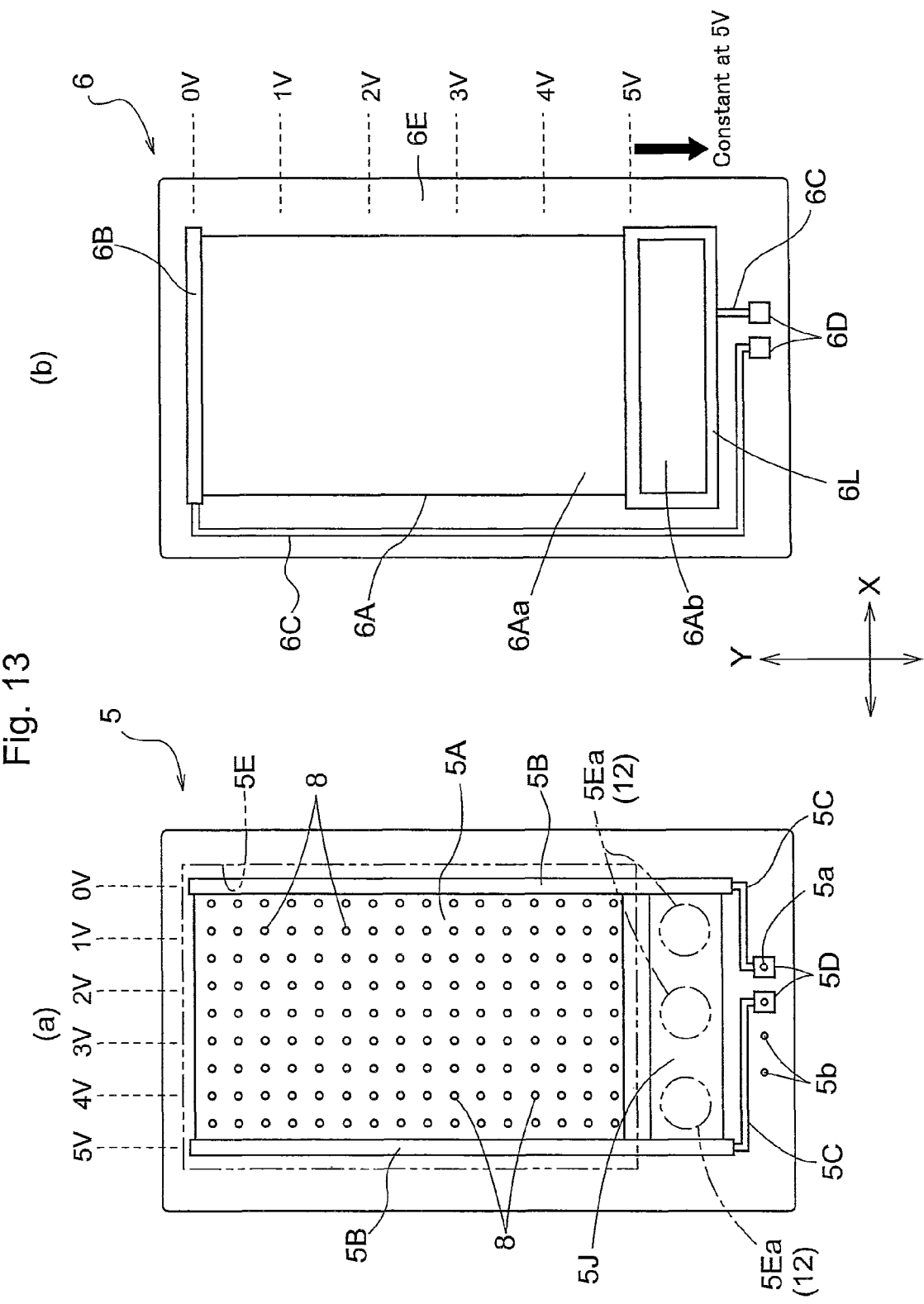
FIG. 13 shows a front view of the rear substrate and a rear view of the front substrate in still another embodiment.
Figure 14:
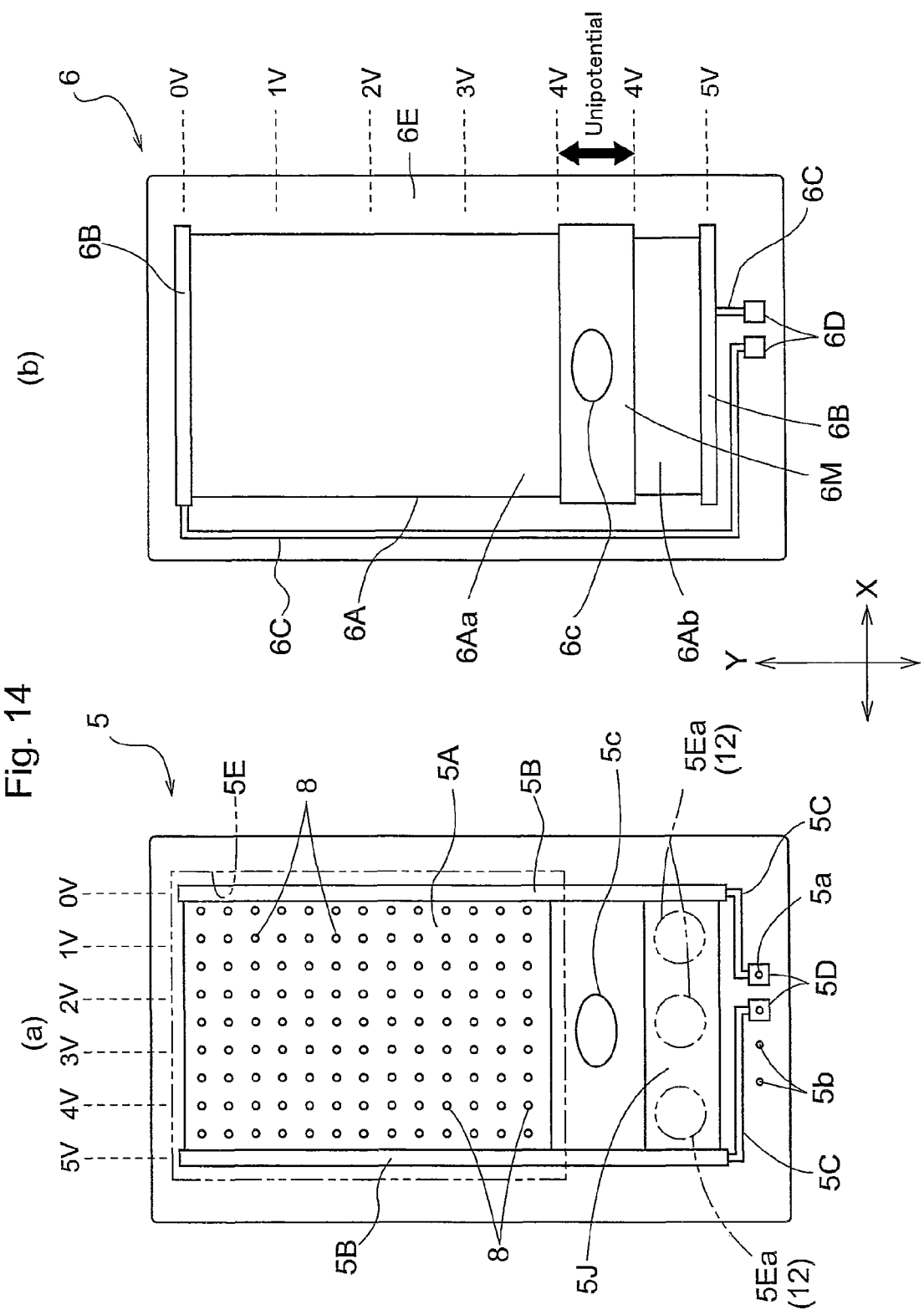
FIG. 14 shows a front view of the rear substrate and a rear view of the front substrate in yet another embodiment.

(4) In addition, as shown in FIGS. 13-15, the expanded region 6Ab of the transparent resistive film 6A of the second embodiment, except for at least a portion where the switch 12 is provided, may be covered with the same material as that of the bus bar 6B.

In the case where only a pair of the bus bars 6B are provided like the second embodiment, in the example of FIG. 6, a voltage value of 4-5 V is used for detecting a position on the expanded region 6Ab in the Y-direction, and a voltage value of 0-4 V is used for detecting a position on the analog coordinate input part Aa in the Y-direction. On the other hand, as shown in FIGS. 13 and 15, in the case where the expanded region 6Ab is surrounded by a frame-like conductive part 6L made of the same material as that of the bus bar 6B, a voltage value of the expanded region 6Ab becomes constant, and thus in the example of FIGS. 13 and 15, a voltage value of 0-5 V is used for detecting a position on the analog coordinate input part Aa in the Y-direction. In other words, the voltage value used in the analog coordinate input part Aa becomes larger than that in the second embodiment, and thus a resolution to detect the coordinate input becomes greater. It should be noted that, instead of surrounding the periphery, when a bus bar is provided in an intermediate portion as shown in FIG. 14, a voltage value only across an intermediate bus bar 6M becomes constant.

(5) In addition, as shown in FIGS. 14 and 15, with respect to the configuration described in the previous item, the openings 5c,6c may be provided in a portion covered with the same material as that of the bus bar 6B, between the analog coordinate input part Aa and the switches 12.

In the case of the present embodiment, even though an opening is provided in the transparent resistive film 6A, failure of detection due to broken linearity will not occur, and thus a microphone hole, a speaker, a mechanical switch and the like provided in the housing 2 can be allowed to face externally between the analog coordinate input part Aa and the switches 12, and thus design freedom can be enhanced.

Figure 16:
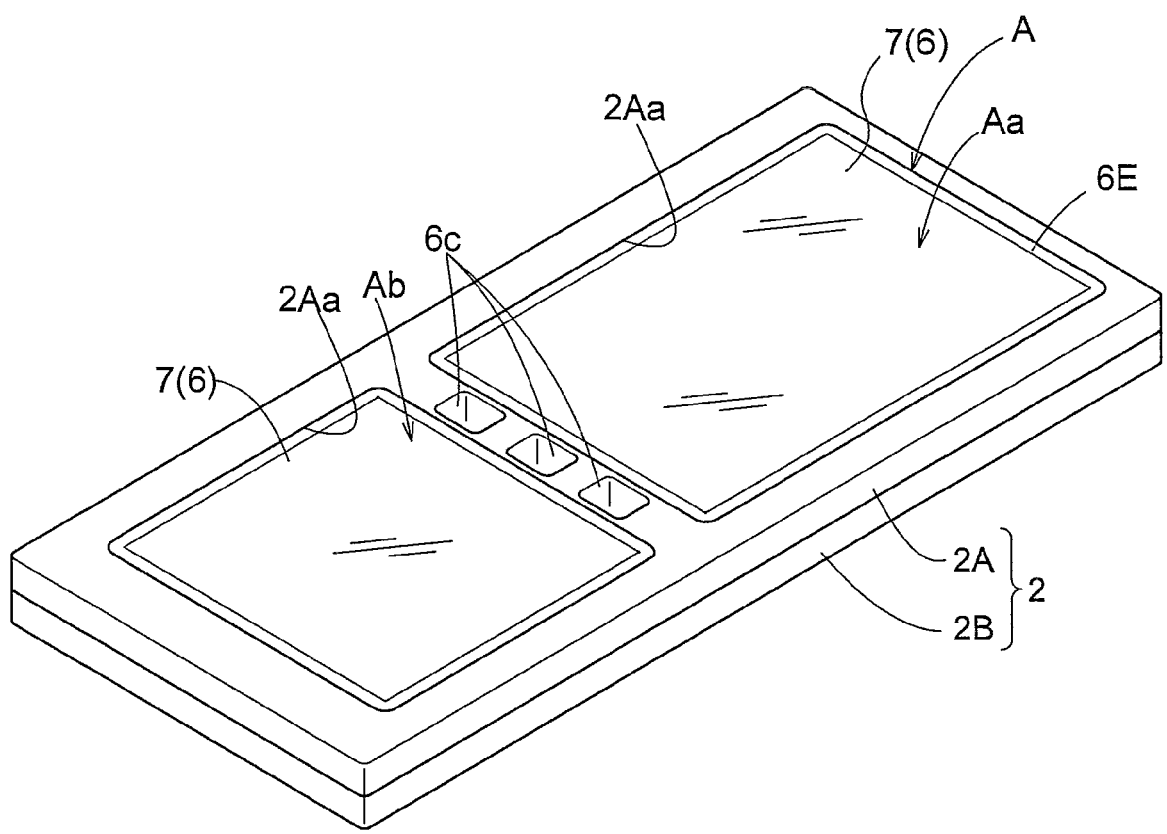
FIG. 16 is a perspective view of the electronic device having two coordinate input parts.
Figure 17:
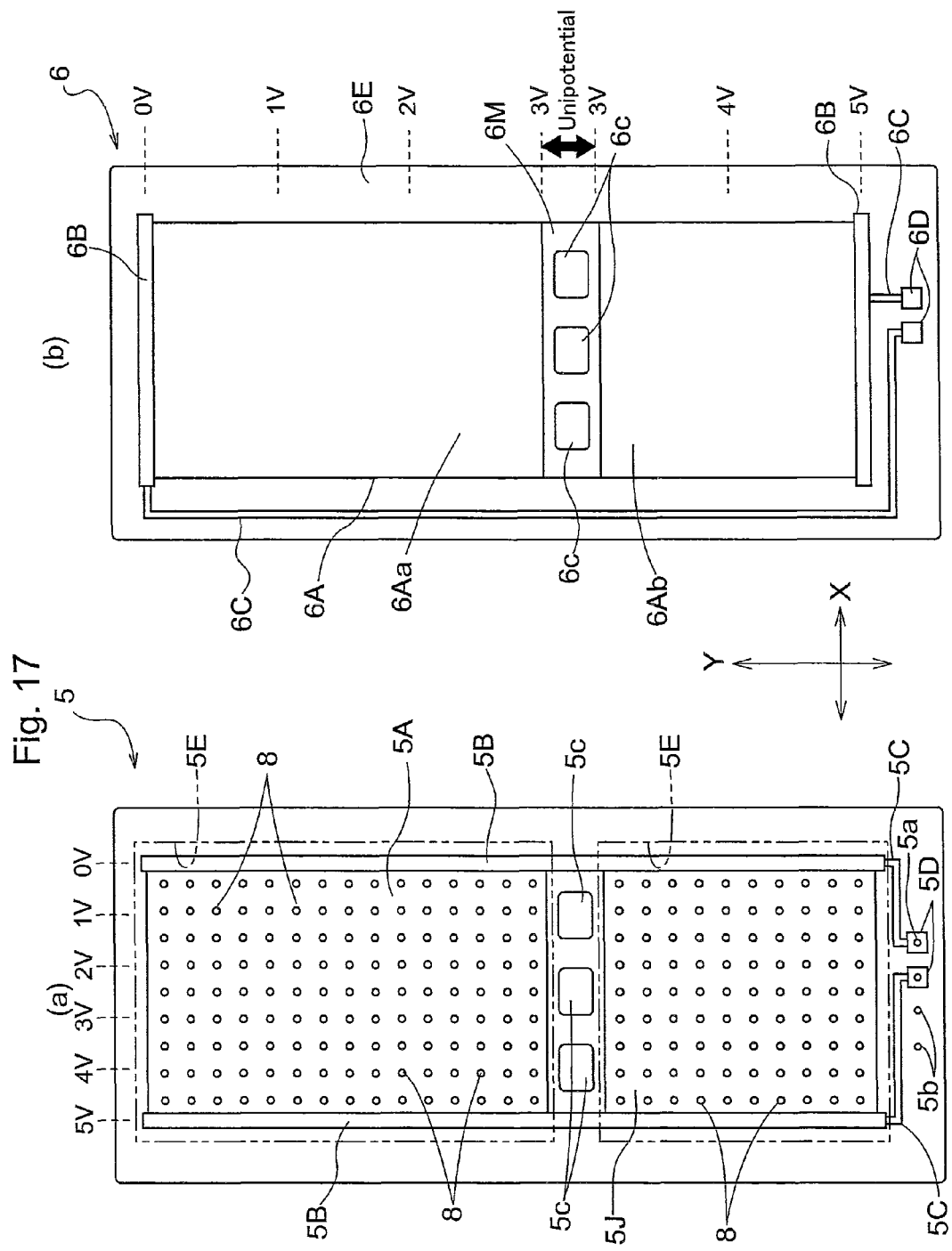
FIG. 17 shows a front view of the rear substrate and a rear view of the front substrate in another embodiment.

(6) In addition, as shown in FIGS. 16 and 17, the expanded region 6Ab of the transparent resistive film 6A may be configured as an analog coordinate input part Ab separate from the analog coordinate input part Aa corresponding to the facing region 6Aa. In this case, for example, the transparent resistive film 5J connected to a pair of the terminals 5D is disposed at a position opposing to the expanded region 6Ab of the transparent resistive film 6A so as to be arranged in parallel with the transparent resistive film 5A, to thereby provide the analog coordinate input part Ab. Further, between the facing region 6Aa and the expanded region 6Ab of the transparent resistive film 6A, the intermediate bus bar 6M covered with the same material as that of the bus bar 6B may be disposed, and the openings 5c,6c may be formed in the intermediate bus bar 6M.

Figure 18:
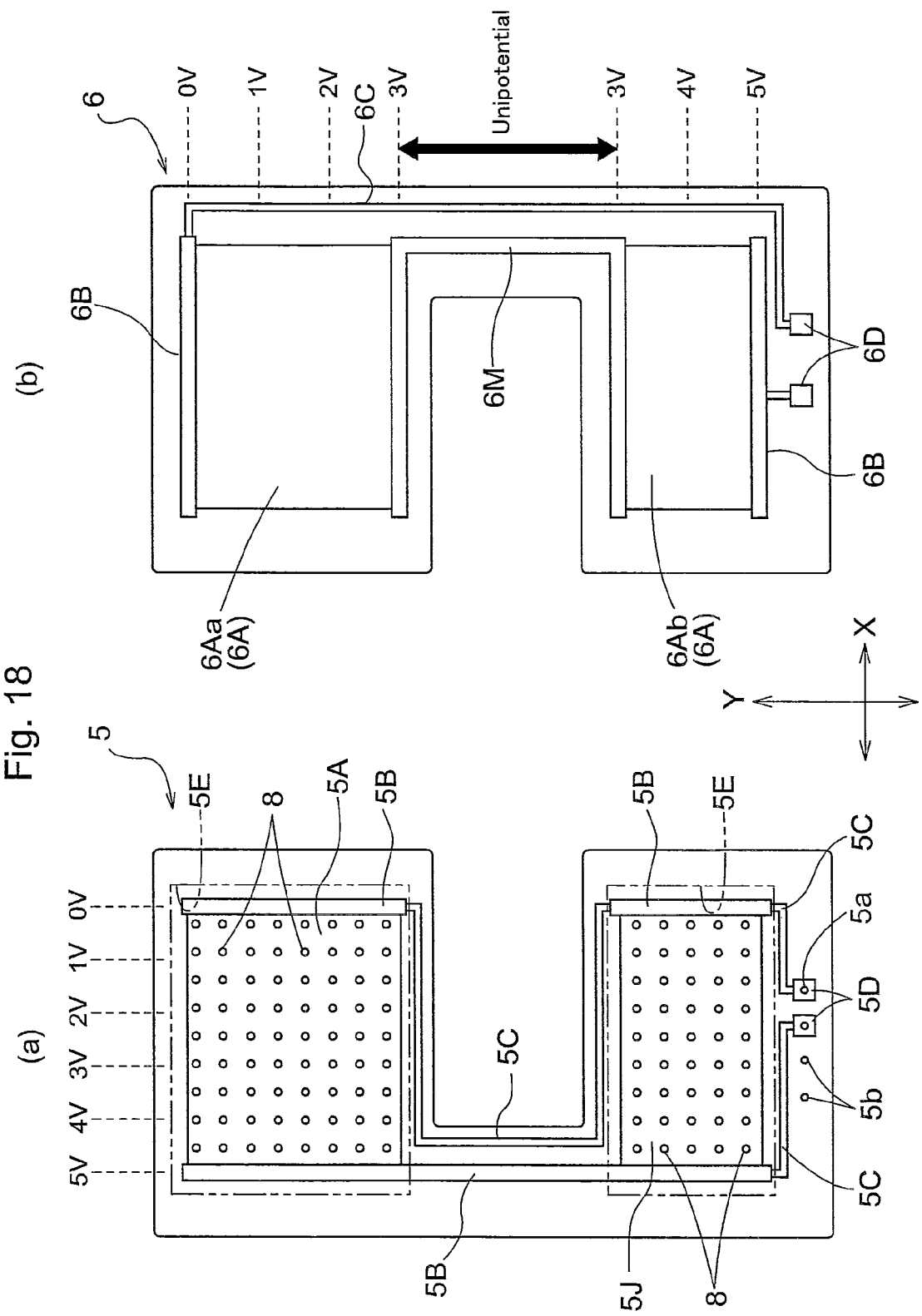
FIG. 18 shows a front view of the rear substrate and a rear view of the front substrate in still another embodiment.

(7) In addition, as shown in FIG. 18, the expanded region 6Ab may be configured as the analog coordinate input part Ab separate from the analog coordinate input part Aa corresponding to the facing region 6Aa, by shaping the protection panel A so as to have an intermediate portion removed on one of a right side and a left side. In this case, the square U-shaped intermediate bus bar 6M covered with the same material as that of the bus bar 6B is placed between the facing region 6Aa and the expanded region 6Ab. The transparent resistive film 5J connected to a pair of the terminals 5D is disposed at a position opposing to the expanded region 6Ab so as to be arranged in parallel with the transparent resistive film 5A, to thereby provide the analog coordinate input part Ab. With this configuration, even in the case where the switch or the like is provided between the analog coordinate input part Aa and the analog coordinate input part Ab, there is no need to provide an opening in the intermediate bus bar M, and the protection panel A can be easily fabricated. Furthermore, the area between the analog coordinate input part Aa and the analog coordinate input part Ab is widely secured on one of the right side and the left side, and thus arrangement freedom of the switches or the like can be enhanced.

Figure 19:
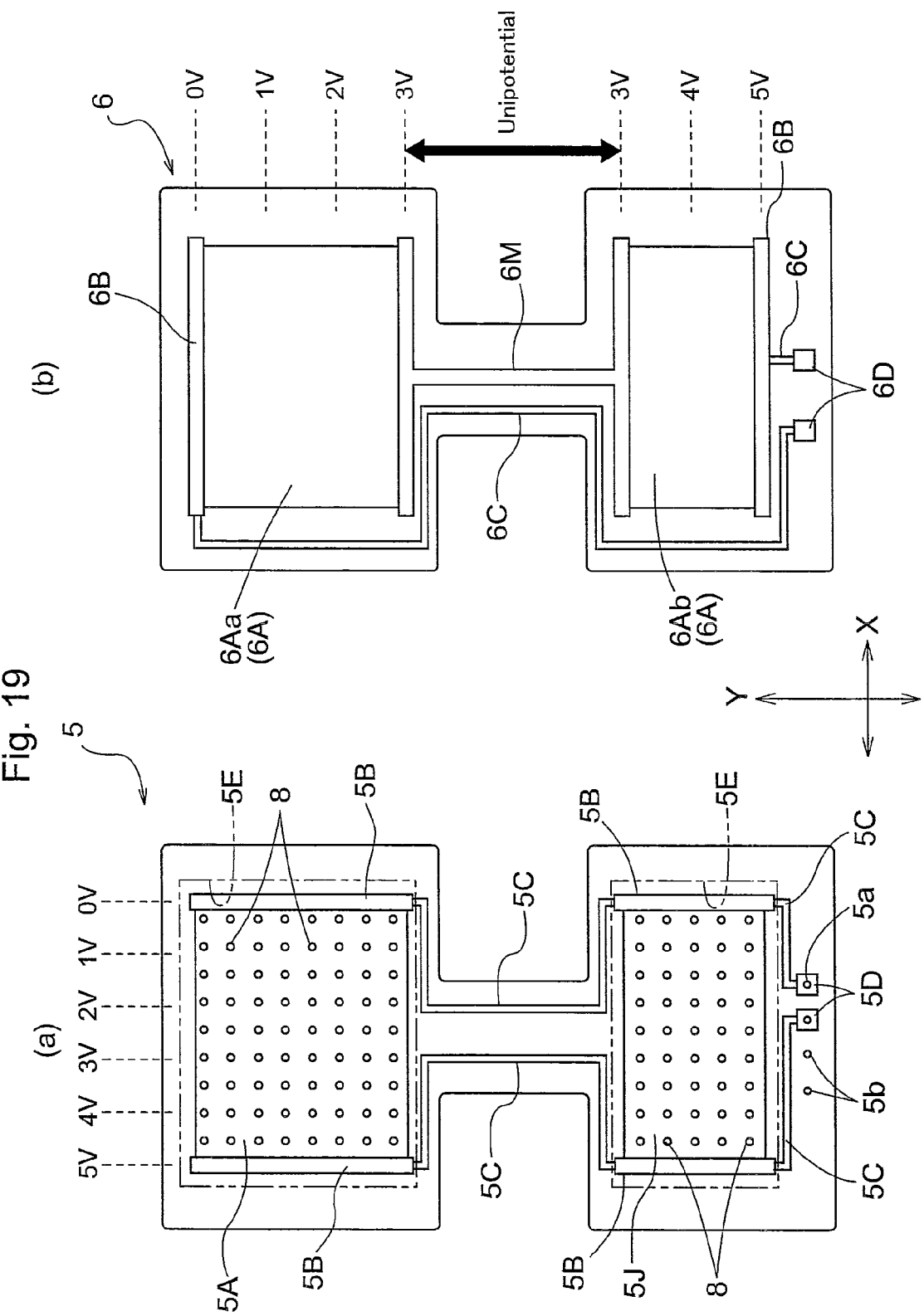
FIG. 19 shows a front view of the rear substrate and a rear view of the front substrate in yet another embodiment.
Figure 20:
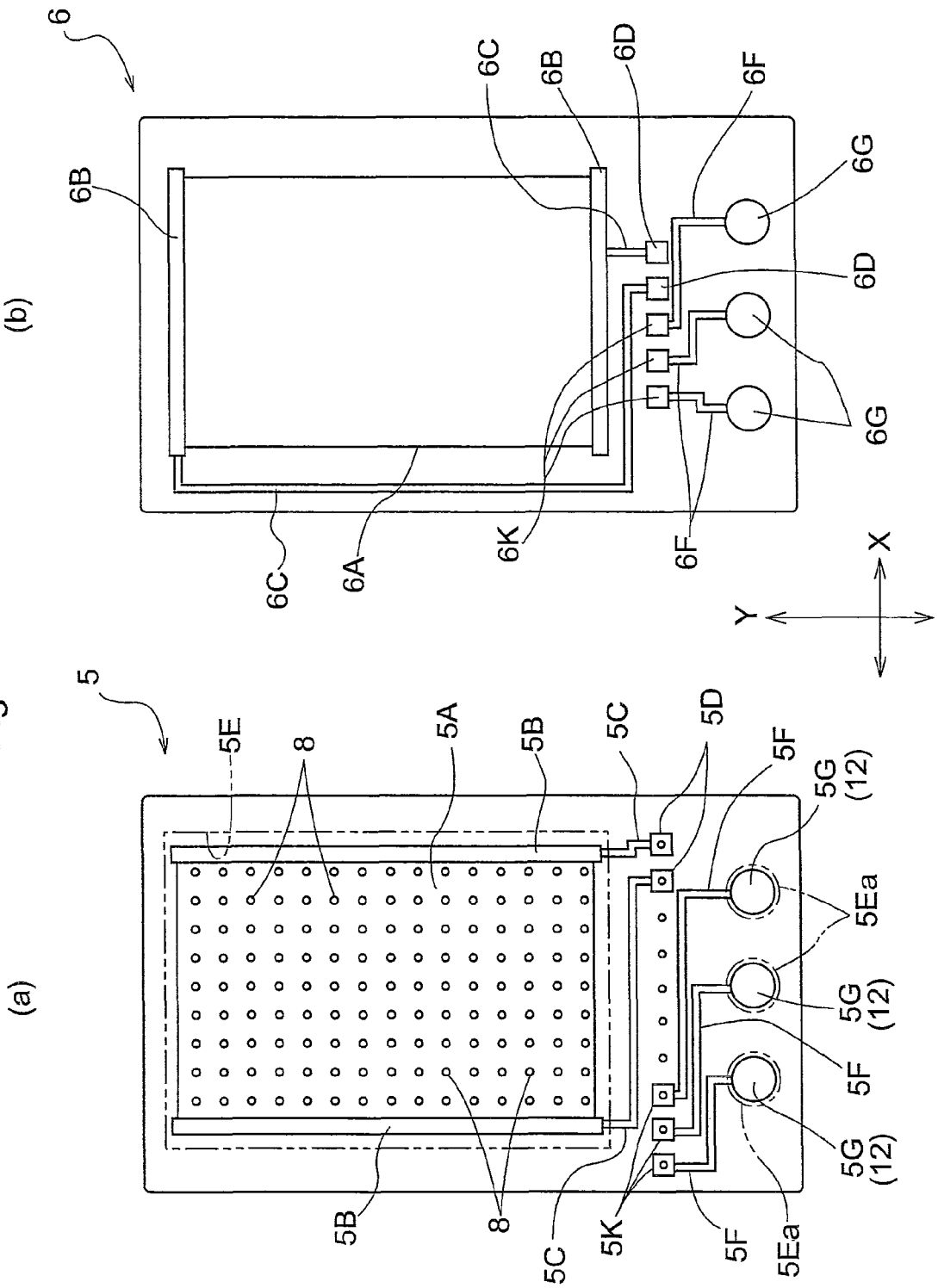
FIG. 20 shows a front view of the rear substrate and a rear view of the front substrate according the prior art technique.

(8) In addition, as shown in FIG. 19, the expanded region 6Ab may be configured as the analog coordinate input part Ab separate from the analog coordinate input part Aa corresponding to the facing region 6Aa, by shaping the protection panel A so as to have areas on the right and left sides in the intermediate portion. In this case, the H-shaped intermediate bus bar 6M covered with the same material as that of the bus bar 6B is placed between the facing region 6Aa and the expanded region 6Ab. The transparent resistive film 5J connected to a pair of the terminals 5D is disposed at a position opposing to the expanded region 6Ab so as to be arranged in parallel with the transparent resistive film 5A, to thereby provide the analog coordinate input part Ab. With this configuration, even in the case where the switch or the like is provided between the analog coordinate input part Aa and the analog coordinate input part Ab, there is no need to provide an opening in the intermediate bus bar M, and the protection panel A can be easily fabricated. Furthermore, a switch for the analog coordinate input part Aa and a switch for the analog coordinate input part Ab may be distributed on the right side and the left side in the area between the analog coordinate input part Aa and the analog coordinate input part Ab, and thus operability of the electronic device B can be enhanced.

(9) In addition, in each of the embodiments described above, the circuit configuration of the front face of the rear substrate 5 and the circuit configuration of the rear face of the front substrate 6 may be interchanged.

It should be noted that the present invention is fully described in connection with the preferred embodiments with reference to the accompanying drawings, and various variations and modifications thereof are apparent for those skilled in the art. Such variations and modifications should be construed to be included in the scope of the claims of the present invention unless they deviate from the scope of the claims.

Industrial Applicability

The present invention is applicable to the electronic device, such as mobile-phone, smartphone, PDA, car navigation equipment, digital camera, digital video camera, portable gaming device, and tablet, having a protection panel on which a touch input operation can be performed in accordance with a displayed content, while the protection panel protects the display part of the display device provided in the electronic device.

The invention claimed is:

1. A protection panel with touch input function comprising:
a rear substrate whose front face is provided with a first transparent resistive film, a pair of first bus bars arranged on opposing sides of the first transparent resistive film, and a pair of first terminals connected to the respective first bus bars through respective first routing circuits; and
a front substrate whose rear face is provided with a second transparent resistive film, a pair of second bus bars arranged on opposing sides of the second transparent resistive film, and a pair of second terminals connected to the respective second bus bars through respective second routing circuits, and whose front face is provided with a decorated rim portion,
the rear substrate and the front substrate being connected so that the first and second transparent resistive films are arranged opposingly with a predetermined gap and that the pair of the first bus bars are arranged on the opposing sides of the first transparent resistive film in an X-direction and the pair of the second bus bars are arranged on the opposing sides of the second transparent resistive film in a Y-direction, to form an analog coordinate input part for detecting an X-Y coordinate as an operation position from a potential gradient based on a touch operation to the front substrate,
wherein
on the rear face of the front substrate, the second transparent resistive film comprises a facing region facing the first transparent resistive film and an expanded region not facing the first transparent resistive film, with a distance between the pair of the second bus bars being larger than a length of the first transparent resistive film in the Y-direction,
on the front face of the rear substrate, a contact point, connected to each of the first terminals through the first routing circuits and not through the first transparent resistive film, is connected in parallel with the first transparent resistive film,
when the rear substrate and the front substrate are connected, the contact point is arranged opposingly with a predetermined gap to the expanded region of the second transparent resistive film, and
the contact point and the expanded region of the second transparent resistive film form a switch for detecting a contact therebetween, based on a voltage detected in the terminals of one of the rear substrate and the front substrate when a voltage is applied between the terminals of the other of the rear substrate and the front substrate.

2. A protection panel with touch input function comprising:
a rear substrate whose front face is provided with a first transparent resistive film, a pair of first bus bars arranged on opposing sides of the first transparent resistive film, and a pair of first terminals connected to the respective first bus bars through respective first routing circuits; and
a front substrate whose rear face is provided with a second transparent resistive film, a pair of second bus bars arranged on opposing sides of the second transparent resistive film, and a pair of second terminals connected to the respective second bus bars through respective second routing circuits, and whose front face is provided with a decorated rim portion,
the rear substrate and the front substrate being connected so that the first and second transparent resistive films are arranged opposingly with a predetermined gap and that the pair of the first bus bars are arranged on the opposing sides of the first transparent resistive film in a Y-direction and the pair of the second bus bars are arranged on the opposing sides of the second transparent resistive film in an X-direction, to form an analog coordinate input part for detecting an X-Y coordinate as an operation position from a potential gradient based on a touch operation to the front substrate,
wherein
on the front face of the rear substrate, the first transparent resistive film comprises a facing region facing the second transparent resistive film and an expanded region not facing the second transparent resistive film, with a distance between the pair of the first bus bars being larger than a length of the second transparent resistive film in the Y-direction,
on the rear face of the front substrate, a contact point, connected to each of the second terminals through the second routing circuits and not through the second transparent resistive film, is connected in parallel with the second transparent resistive film,
when the rear substrate and the front substrate are connected, the contact point is arranged opposingly with a predetermined gap to the expanded region of the first transparent resistive film, and the contact point and the expanded region of the first transparent resistive film form a switch for detecting a contact therebetween, based on a voltage detected in the terminals of one of the rear substrate and the front substrate when a voltage is applied between the terminals of the other of the rear substrate and the front substrate.

* * * * *